United States Patent
Okabe et al.

(10) Patent No.: US 8,056,926 B2
(45) Date of Patent: Nov. 15, 2011

(54) VEHICLE FRONT BODY STRUCTURE

(75) Inventors: Kojiro Okabe, Wako (JP); Fumitoshi Kase, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/746,274

(22) PCT Filed: Nov. 21, 2008

(86) PCT No.: PCT/JP2008/071745
§ 371 (c)(1),
(2), (4) Date: Jun. 4, 2010

(87) PCT Pub. No.: WO2009/072450
PCT Pub. Date: Jun. 11, 2009

(65) Prior Publication Data
US 2010/0259033 A1    Oct. 14, 2010

(30) Foreign Application Priority Data

Dec. 4, 2007  (JP) ................................. 2007-313767
Dec. 6, 2007  (JP) ................................. 2007-315842
Jul. 14, 2008 (JP) ................................. 2008-183166

(51) Int. Cl.
*B62D 7/22* (2006.01)

(52) U.S. Cl. .......................... 280/784; 180/311; 280/735

(58) Field of Classification Search ............... 280/784, 280/781, 734, 735; 180/311, 312
See application file for complete search history.

(56) References Cited

U.S. PATENT DOCUMENTS

| | | | |
|---|---|---|---|
| 2005/0077711 A1* | 4/2005 | Yasui et al. | 280/735 |
| 2005/0225341 A1 | 10/2005 | Byrd | |
| 2006/0043711 A1* | 3/2006 | Kuze et al. | 280/735 |
| 2006/0232104 A1 | 10/2006 | Yasuhara | |
| 2007/0176443 A1 | 8/2007 | Yasuhara et al. | |

FOREIGN PATENT DOCUMENTS

| | | |
|---|---|---|
| JP | 2004-003938 | 1/2004 |
| JP | 2005-225341 | 8/2005 |
| JP | 2006-062542 | 3/2006 |
| JP | 2007-190964 | 8/2007 |

* cited by examiner

*Primary Examiner* — Eric Culbreth
(74) *Attorney, Agent, or Firm* — Rankin, Hill & Clark LLP

(57) ABSTRACT

Overlapping section (81) is constructed by positioning an inner side wall portion (78) of an outer impact absorbing section (63) closer to a longitudinal centerline (48) of a vehicle body than an outer side wall (33, 103) of a front side frame (11, 12; 91), so that a collision impact load can be transmitted to the outer side wall portion by way of the overlapping section. Inner impact absorbing section (62) projects forward by a greater length than an outer impact absorbing section (63). Thus, an airbag-deploying acceleration threshold value Gs is set within a range between an acceleration level when the inner impact absorbing section (62) alone is deformed by impact energy and an acceleration level when the inner and outer impact absorbing sections (62, 63) are deformed.

16 Claims, 18 Drawing Sheets

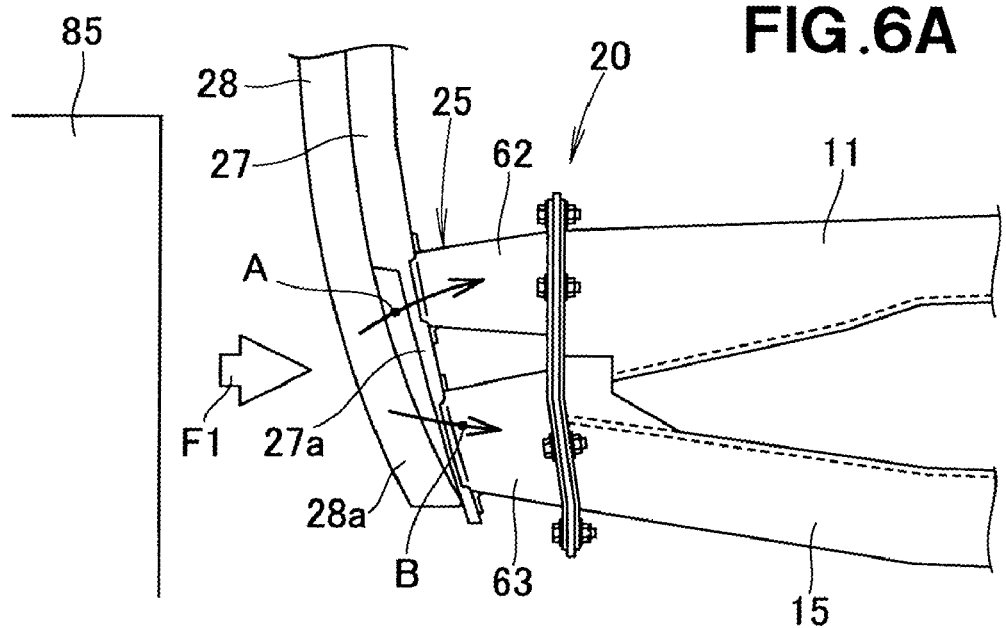
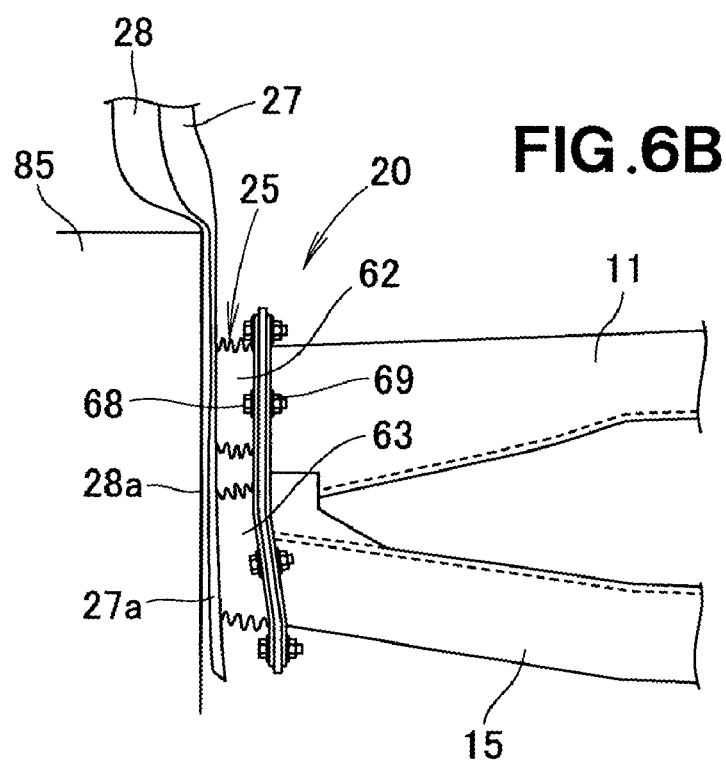

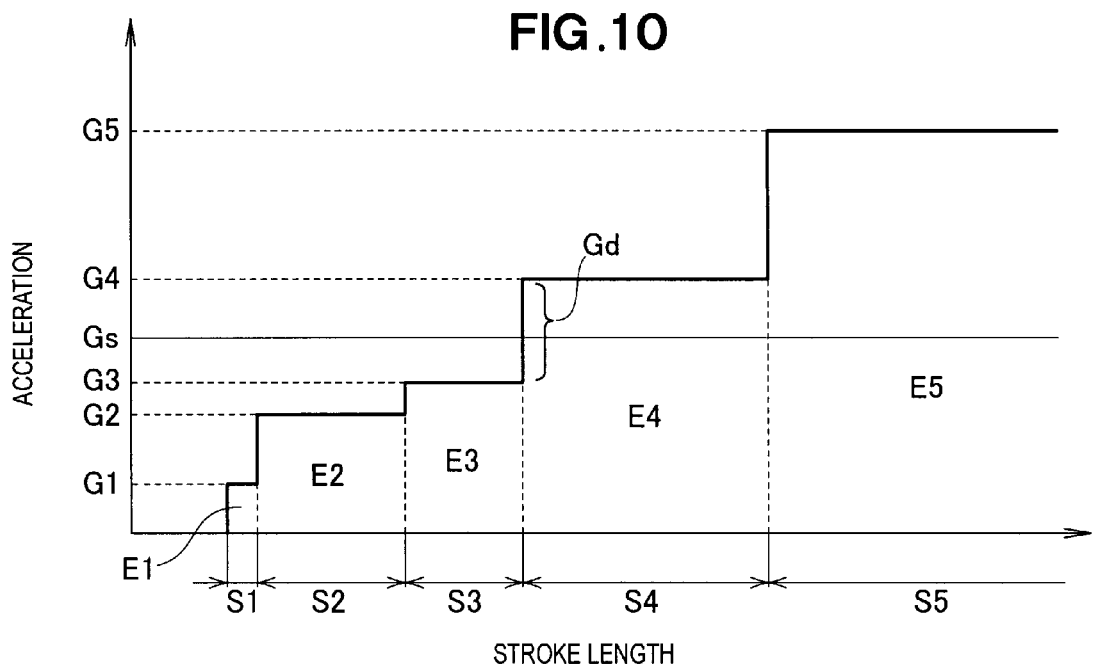

VEHICLE FRONT BODY STRUCTURE

TECHNICAL FIELD

The present invention relates to vehicle front body structures where impact absorbing sections are provided on left and right front side frames and a bumper beam is fixedly mounted to the impact absorbing sections. The present invention also relates to vehicle front body structures where impact absorbing sections are provided on left and right front side frames and acceleration sensors for an airbag are provided on the impact absorbing sections.

BACKGROUND ART

Among the conventionally-known vehicle front body structures are ones which include, on each of left and right sides of the vehicle body, an upper member disposed laterally outwardly of a corresponding (i.e., left or right) front side frame, inner and outer impact absorbing sections provided on respective front end portions of the front side frame and upper member in spaced-apart relation to each other in a width direction of the vehicle body, and a bumper beam fixed to the inner and outer impact absorbing sections.

One example of such vehicle front body structures is disclosed in Japanese Patent Application Laid-Open Publication No. 2007-190964 (JP 2007-190964 A), which will be described below with reference to FIG. 20 hereof. FIG. 20 is a view illustrating how impact energy caused by an offset collision (i.e., collision impact energy) is absorbed in the conventional vehicle front body structure, only with respect to one of the left and right sides (left side in the illustrated example of FIG. 20) of the vehicle front body structure. In the vehicle front body structure 200, inner and outer impact absorbing sections 203 and 204, constituting an impact absorbing unit of the structure 200, are provided on respective front end portions of the left front side frame 201 and upper member 202; thus, the impact absorbing unit can have an increased overall width. Consequently, in case an impact load is applied to a bumper beam 205 as indicated by white arrow f, each of the impact absorbing sections 203 and 204 can be prevented from undesirably tilting sideways, so that the applied impact load f can be transmitted via the absorbing sections 203 and 204 to the left front side frame 201 and upper member 202.

Inner side wall portion 204a of the outer impact absorbing section 204 is spaced outwardly from an outer side wall portion 201a of the left front side frame 201 by a distance S. Thus, when another vehicle 210 has collided against the vehicle in question (i.e., vehicle where the vehicle front body structure 200 is employed) with an offset (e.g., leftward offset) from a longitudinal centerline extending centrally through the width of the vehicle in question, a collision impact load applied to the bumper beam 205 is transmitted to the left front side frame 201 and left upper member 202 by way of the absorbing sections 203 and 204 as indicated by arrow a and b.

Such an offset collision would deform the bumper beam 205 as depicted by imaginary lines, and thus, the collision impact load would act toward the longitudinal centerline of the vehicle body as indicated by arrow c. This impact load is applied to the left front side frame 201 and would bend the left front side frame 201 in a direction indicated by arrow d. For this reason, a stiffener (partitioning plate) functioning as an reinforcing member is provided on the left front side frame 201 for preventing the side frame 201 from being bendingly deformed as indicated by arrow d. However, if the left front side frame 201 is reinforced with such a stiffener, the left front side frame 201 would undesirably increase in weight.

Also known in the art are vehicle front body structures where, on each of the left and right sides of the front vehicle body, respective front end portions of the front side frame and upper member are interconnected via a connecting frame and an acceleration sensor is provided on the connecting frame. Occurrence (i.e., presence/absence) of a collision is determined on the basis of acceleration (deceleration) detected by the acceleration sensor. Once it is determined that a collision has occurred to the vehicle, an airbag is developed or deployed to protect a vehicle occupant. One example of such vehicle front body structures is disclosed in Japanese Patent No. 3930004 (JP 3,930,004 B).

Also known in the art are vehicle front body structures which can absorb impact energy caused not only by a low-speed collision but also by a high-speed collision. Thus absorbing impact energy caused by a low-speed collision can protect an object having collided against the vehicle in question, while absorbing impact energy caused by a high-speed collision can protect a vehicle occupant. By providing such vehicle front body structure with the acceleration sensors as disclosed in JP 3,930,004 B, an airbag can be deployed into a vehicle compartment once acceleration detected by any of the acceleration sensors exceeds a predetermined airbag-deploying acceleration threshold value; this arrangement can protect a vehicle occupant even more effectively.

In order keep the airbag undeployed at the time of a low-speed collision and to get deployed only at the time of a high-speed collision, it is necessary to set an appropriate airbag-deploying acceleration threshold value with a high accuracy. The acceleration produced by impact energy would fluctuate to some degree. Therefore, in order to set the airbag-deploying acceleration threshold value with a high accuracy, it is preferable to set the airbag-deploying acceleration threshold value within a range in which the acceleration presents a sharp increase, i.e., within a range of a great (and hence clear) acceleration change rate. However, because the vehicle front body structures have a low-speed-collision absorbing function capable of absorbing impact energy caused by a low-speed collision, the low-speed-collision absorbing function would undesirably work at the time of a high-speed collision. Therefore, it is difficult to secure a great acceleration rate for a high-speed collision and set the airbag-deploying acceleration threshold value within the range of the clear acceleration change rate. Therefore, it has been difficult to accurately determine, on the basis of a prestored (preset) airbag-deploying acceleration threshold value, proper timing (or acceleration level) at which the airbag is to be deployed

DISCLOSURE OF THE INVENTION

It is therefore an object of the present invention to provide an improved vehicle front body structure which can secure a sufficient rigidity of each front side frame against unwanted bending and achieve reduction in weight of the front side frame.

It is another object of the present invention to provide an improved vehicle front body structure which can appropriately absorb impact energy caused by both a low-speed collision and a high-speed collision and can set an appropriate airbag-deploying acceleration threshold value within a range of a great and hence clear acceleration change rate.

In order to accomplish the above-mentioned objects, the present invention provides an improved vehicle front body structure including, on each of left and right sides of a vehicle body, a front side frame extending in a front-rear direction of the vehicle body, and an upper member disposed laterally outwardly of the front side frame, which comprises: inner and outer impact absorbing sections provided on respective front end portions of the front side frame and upper member for absorbing an impact load acting on a front of the vehicle body; an overlapping section constructed by positioning an inner side wall portion of the outer impact absorbing section closer to a longitudinal centerline of the vehicle body than an outer side wall portion of the front side frame so that a rear end portion of the outer impact absorbing section and a front end portion of the front side frame partly overlap each other.

When another vehicle has collided against the vehicle in question (i.e., vehicle where the inventive vehicle front body structure is employed) with an offset leftward or rightward from the longitudinal centerline, part of a collision impact load, acting on the outer impact absorbing section, can be efficiently transmitted to the outer side wall portion of the front side frame by way of the overlapping section. In this way, the impact load that would act to bend the front side frame toward the longitudinal centerline can be canceled out by the impact load transmitted to the outer side wall portion of the front side frame. As a result, the present invention can achieve a sufficient rigidity of the front side frame against bending without provision of a particular reinforcing member, as well as reduction in weight of the front side frame.

Preferably, the front side frame includes: a compressive-load bearing frame section that extends straight from the inner impact absorbing section toward the rear of the vehicle body, so as to bear an impact load acting in a direction from the inner impact absorbing section toward the rear of the vehicle body; and a bending-load bearing frame section that extends from a substantial longitudinally-middle portion of the compressive-load bearing frame section toward the rear of the vehicle body and gently bulges toward the longitudinal centerline, so as to bear an impact load acting in a direction from the inner impact absorbing section toward the longitudinal centerline. Thus, when another vehicle has collided against the vehicle in question with an offset leftward or rightward from the longitudinal centerline, a bending load caused by the offset collision can be borne by the bending-load bearing frame section, and an impact load acting on the outer impact absorbing section can be efficiently transmitted to the outer side wall portion of the front side frame by way of the overlapping section. Because the impact load can be efficiently transmitted to the outer side wall portion of the front side frame and the bending load can be canceled out by the impact load transmitted to the outer side wall portion of the left front side frame, the impact load acting on the front side frame can be borne even more reliably.

Preferably, the compressive-load bearing frame section has the outer side wall portion curved gently along the bending-load bearing frame section, so that the front side frame is formed in a gently curved shape. Thus, an impact load transmitted to the outer side wall portion acts along, and is efficiently borne by, the outer side wall portion and bending-load bearing frame section. Because the front side frame is formed in a gently curved shape as noted above, the front side frame need not have a great width, and thus, the present invention permits reduction in weight of the front side frame.

Preferably, the vehicle front body structure of the invention further comprises an acceleration sensor for detecting acceleration of the vehicle to cause an airbag of the vehicle to be deployed when an impact load has acted on the inner and outer impact absorbing sections. The inner impact absorbing section projects forward from the front end portion of the front side frame by a greater projecting length than the outer impact absorbing section projecting forward from the front end portion of the upper member; that is, the inner impact absorbing section projects forward by a greater length than the outer impact absorbing section. Acceleration threshold value for deploying the airbag is set within a range between an acceleration (deceleration) level when a portion of the inner impact absorbing section projecting forward beyond the outer impact absorbing section is deformed by impact energy and an acceleration (deceleration) level when the inner and outer impact absorbing sections are deformed after the deformation of the inner impact absorbing section reaches the outer impact absorbing section.

The inner and outer impact absorbing sections project forward by different projecting lengths; namely, the inner impact absorbing section projects forward by a greater projecting length than the outer impact absorbing section. Thus, impact energy caused by a low-speed collision can be absorbed by deformation of the portion of the inner impact absorbing section projecting forward beyond the outer impact absorbing section, and impact energy caused by a high-speed collision can be absorbed by deformation of the inner and outer impact absorbing sections.

The "low-speed collision" is, for example, a collision at less than 20 km/h, while the "high-speed collision" is, for example, a collision at more than 20 km/h. Examples of the low-speed collision or low-speed include a so-called low-speed or high-speed offset collision where another vehicle collides against the vehicle in question with a leftward or rightward offset from the longitudinal centerline.

As the outer impact absorbing section starts deforming in response to a high-speed offset collision, impact energy caused by the high-speed offset collision is absorbed by both of the inner and outer impact absorbing sections, so that great acceleration can be produced in the vehicle, namely, the acceleration increases sharply. By such great acceleration being produced, a great (and hence clear) acceleration change rate (or difference) can be achieved between the acceleration level when the portion of the outer impact absorbing section projecting forward beyond the inner impact absorbing section is deformed by the impact energy (i.e., when the impact energy is absorbed by the inner impact absorbing section alone) and the acceleration level when the inner and outer impact absorbing sections are deformed after deformation of the inner impact absorbing section reaches the outer impact absorbing section (i.e., when the impact energy is absorbed by both of the inner and outer impact absorbing sections).

For the foregoing reasons, the present invention sets the acceleration threshold value for deploying the airbag within the range of the great (and hence clear) acceleration change rate between the acceleration level when the impact energy is absorbed by the inner impact absorbing section alone and the acceleration level when the impact energy is absorbed by both off the inner impact absorbing sections. Thus, increase in the acceleration of the vehicle can be reliably detected by use of the acceleration threshold value without being influenced by fluctuation of the acceleration of the vehicle.

Preferably, the acceleration sensor is provided at a position remote from the inner impact absorbing section and close to the outer impact absorbing section. Because the acceleration sensor is located remote from the inner impact absorbing section, the impact energy would not readily transmit to the acceleration sensor during deformation of the portion of the inner impact absorbing section projecting forward beyond the outer impact absorbing section. Further, because the acceleration sensor is provided close to the outer impact absorbing section, the impact energy can efficiently transmit to the acceleration sensor during deformation of the outer impact absorbing section. Consequently, once the outer impact absorbing section starts deforming, great acceleration is produced in the region where the acceleration sensor is provided. Thus, by the provision of the acceleration sensor remote from the inner impact absorbing section and close to the outer impact absorbing section, the present invention can detect the airbag-deploying acceleration threshold value with an even further enhanced accuracy.

BRIEF DESCRIPTION OF DRAWINGS

FIGS. 6A and 6B are views explanatory of a principle in which an impact absorbing structure employed in the first embodiment absorbs impact energy caused by a low-speed offset collision;

FIG. 10 is a graph showing acceleration produced when impact energy has been applied to the first embodiment of the vehicle front body structure;

BEST MODE FOR CARRYING OUT THE INVENTION

In the following description, the terms "front", "rear", "left" and "right" are used to refer to directions as viewed from a human operator or driver of a vehicle.

Figure 1:
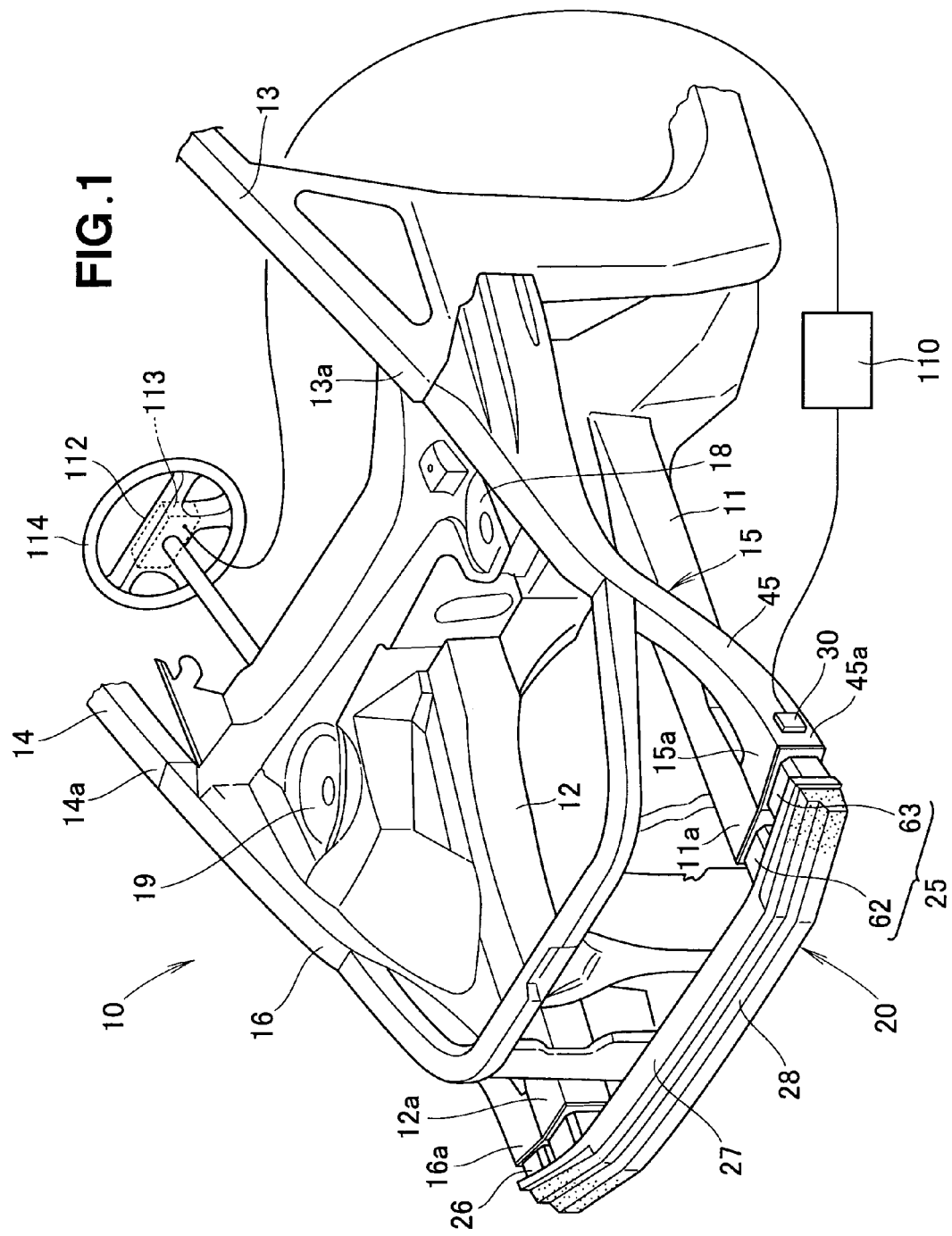
FIG. 1 is a perspective view showing a first embodiment of a vehicle front body structure of the present invention.

Reference is now made to FIG. 1 showing in perspective a first embodiment of a vehicle front body structure 10 of the present invention. The vehicle front body structure 10 includes: left and right front side frames 11 and 12; a left front pillar 13 disposed upwardly and rearwardly of the left side frame 11; a left upper member 15 extending forward from a lower end portion 13a of the left front pillar 13 and disposed laterally outwardly of the left side frame 11; a right front pillar 14 disposed upwardly and rearwardly of the right side frame 12; a right upper member 16 extending forward from a lower end portion 14a of the right front pillar 14 and disposed laterally outwardly of the right side frame 12.

Left wheel house 18 for covering a left front wheel (not shown) is provided between the left front side frame 11 and the left upper member 15, and a right wheel house 19 for covering a right front wheel (not shown) is provided between the right front side frame 12 and the right upper member 16.

Figure 2:
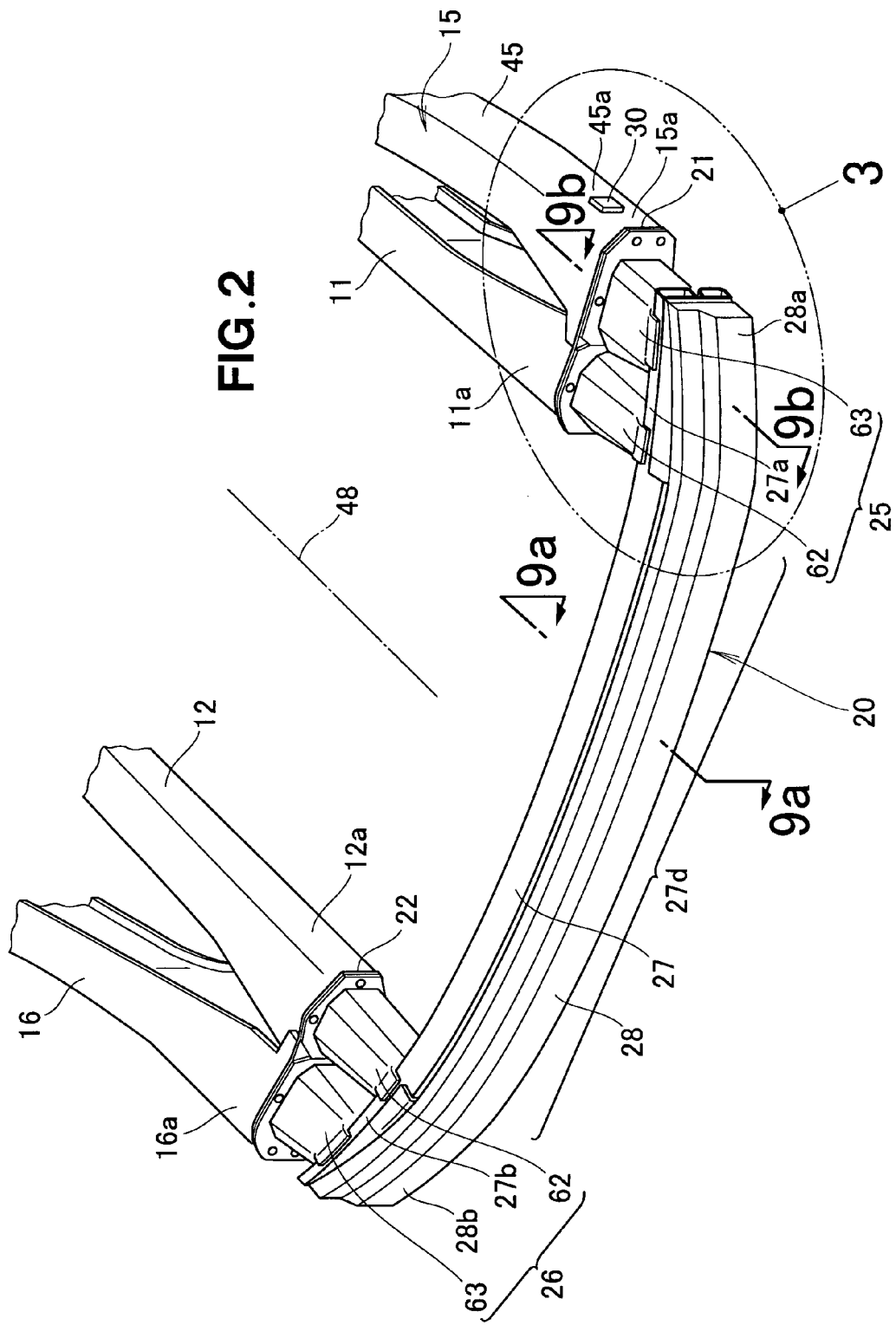
FIG. 2 is a perspective view showing principal sections of the first embodiment of the vehicle front body structure.

FIG. 2 is a perspective view showing principal sections of the first embodiment of the vehicle front body structure 10. In the vehicle front body structure 10, respective front end portions 11a and 15a of the left front side frame 11 and left upper member 15 are positioned side by side along a width direction of the vehicle and are fixedly connected with each other, while respective front end portions 12a and 16a of the right front side frame 12 and right upper member 15 are positioned side by side along the width direction of the vehicle and are fixedly connected with each other. Impact absorbing structure 20 is operatively connected to the front end portions 11a and 15a and 12a and 16a.

Further, left and right acceleration sensors (right acceleration sensor is not shown) 30 are provided on the left and right upper members 15 and 16, as will be later detailed.

The impact absorbing structure 20 includes a left impact absorbing unit 25 connected to the front end portions 11a and 15a via a left mounting plate 21, a right impact absorbing unit 26 connected to the front end portions 12a and 16a via a right mounting plate 22, a bumper beam 27 spanning between the left and right impact absorbing units 25 and 26, and an energy absorbing member 28 fixed to the bumper beam 27.

Namely, the bumper beam 27 is connected at its left end portion 27a to the left impact absorbing unit 25 and connected at its right end portion 27b to the right impact absorbing unit 26.

The left and right front side frames 11 and 12 and the left and right upper members 15 and 16 are disposed and constructed in left-right symmetrical relation to each other, and thus, the left front side frame 11 and left upper member 15 will be primarily or representatively described in detail below with a detailed description of the right front side frame 12 and right upper member 16 omitted. Further, the left and right impact absorbing units 25 and 26 are disposed and constructed in left-right symmetrical relation to each other, and thus, the left impact absorbing unit 25 will be primarily or representatively described in detail below with a detailed description of the elements of the right impact absorbing unit 26 omitted. Further, the left and right acceleration sensor 30 are disposed and constructed in left-right symmetrical relation to each other, and thus, the left acceleration sensor 30 will be primarily or representatively described in detail below with a detailed description of the right acceleration sensor 30 omitted.

Figure 3:
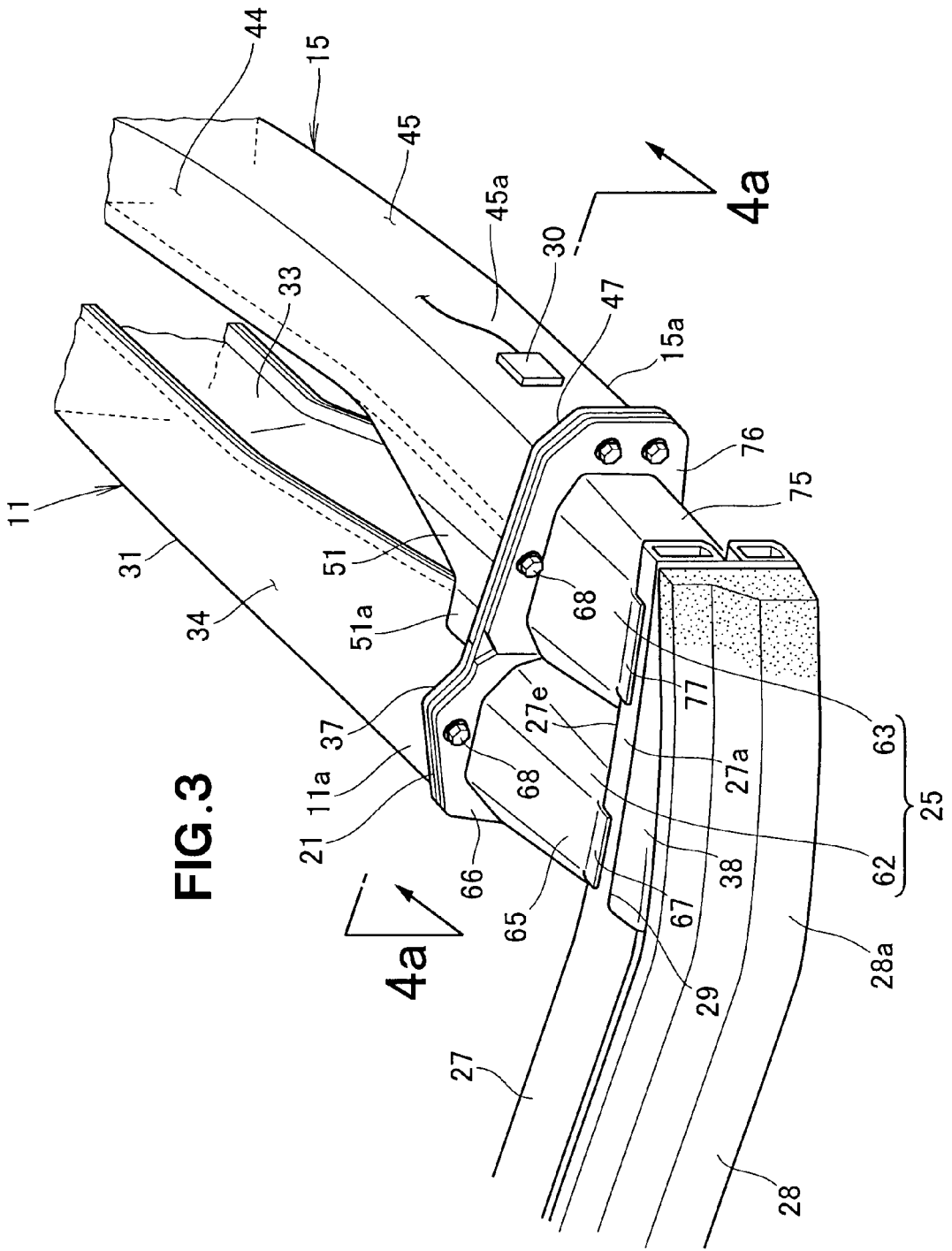
FIG. 3 is a view showing on enlarged scale an encircled section "3" of FIG. 2.
Figure 4A:
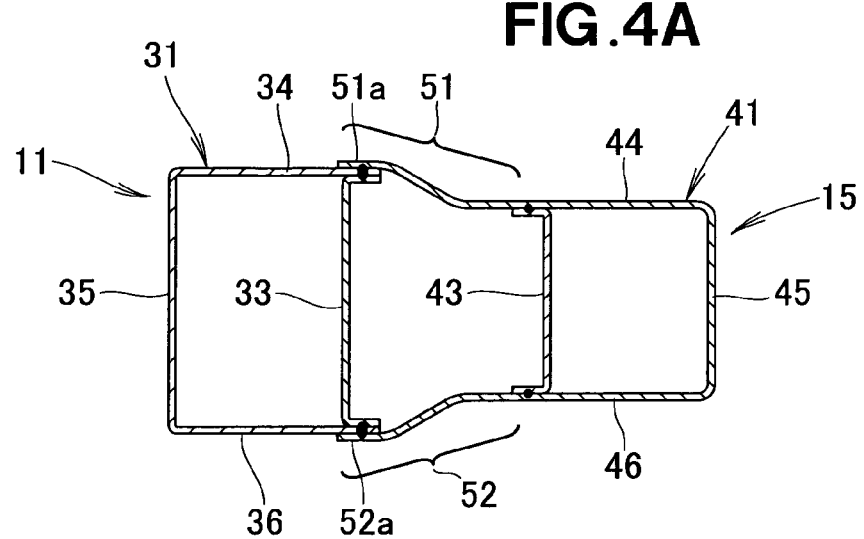
FIG. 4A is a sectional view taken along line 4a-4a of FIG. 3.
Figure 4B:
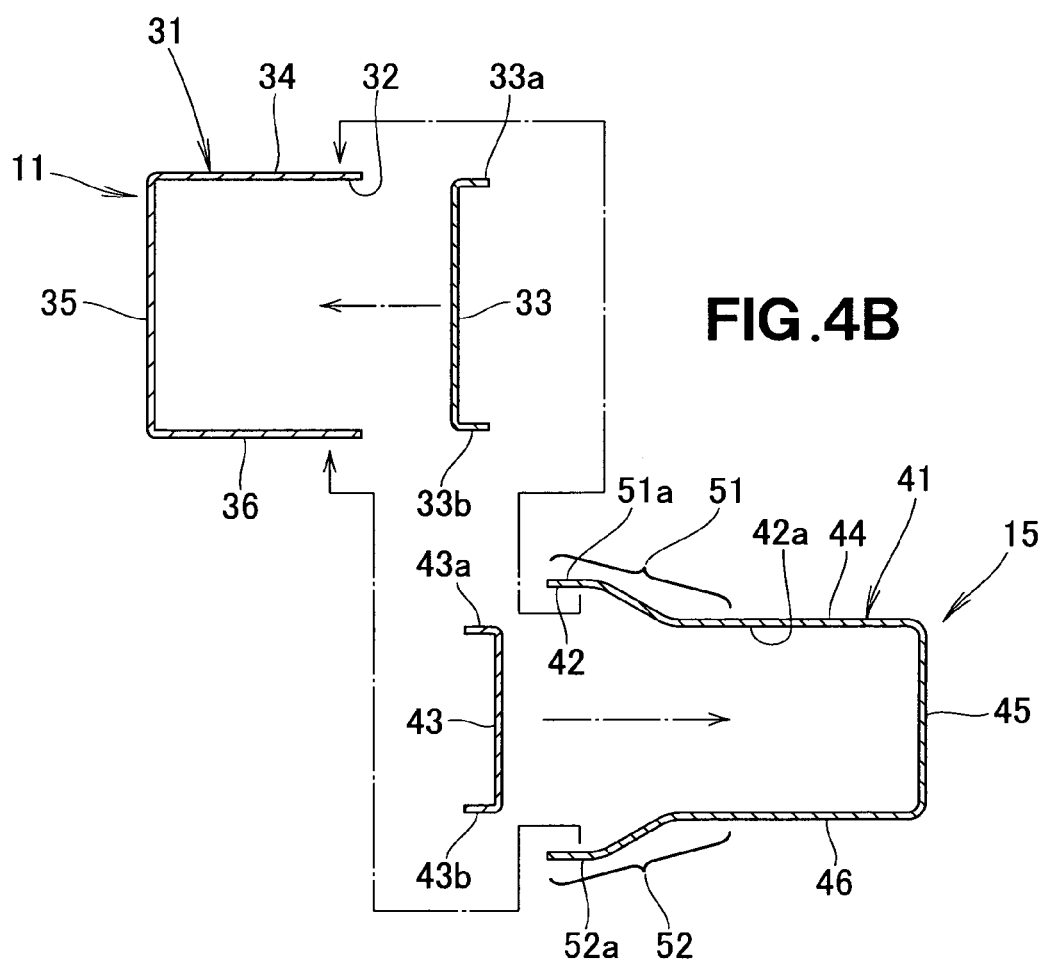
FIG. 4B is an exploded view corresponding to FIG. 4A.

FIG. 3 is a view showing in enlarged scale an encircled section "3" of FIG. 2, FIG. 4A is a sectional view taken along the 4a-4a line of FIG. 3, and FIG. 4B is an exploded view corresponding to FIG. 4A.

The left front side frame 11 includes a side frame member 31 extending in a front-rear direction of the vehicle body and having a laterally-facing U sectional shape with an opening portion 32 opening laterally outward, and an outer side wall member (i.e., outer side wall portion) 33 of a laterally-facing U sectional shape fitted in the opening portion 32 of the side frame member 31.

The side frame member 31 has upper and lower wall portions 34 and 36 extending horizontally in the front-rear and left-right (i.e., width) directions in parallel spaced relation to each other, and an inner side wall portion 35 extending vertically between the respective inner edges of the upper and lower wall portions 34 and 36. The outer side wall 33 has upper and lower outwardly-bent portions 33a and 33b extending along upper and lower inner surfaces of the opening portion 32 of the side frame member 31.

The left upper member 15 includes an upper member element 41 extending in the front-rear and width directions of the vehicle body and having a laterally-facing U sectional shape with an opening portion 42 opening laterally inward, and an inner side wall member 43 of a laterally-facing U sectional shape fitted in an opening portion 42a.

The upper member element 41 has upper and lower wall portions 44 and 46 extending horizontally in the front-rear and width directions in parallel spaced relation to each other, and an outer side wall portion 45 extending vertically between the respective outer edges of the upper and lower wall portions 44 and 46.

The inner side wall member 43 has upper and lower inwardly-bent portions 43a and 43b extending along upper and lower inner surfaces of the opening portion 42a of the upper member element 41. The upper wall portion 44 has an upward bulge 51 formed on its front end region and bulging obliquely upward toward a longitudinal centerline 48 (FIG. 2) extending centrally through the width of the vehicle body. The upward bulge 51 has a distal end region 51a fixed by welding to the upper surface of the upper wall portion 34 of the side frame member 31.

Similarly, the lower wall portion 46 has a downward bulge 52 formed at its front end region and bulging obliquely downward toward the longitudinal centerline 48. The downward bulge 52 has a distal end region 52a fixed by welding to the lower surface of the lower wall portion 36 of the side frame member 31.

In the aforementioned manner, the respective front end portions 11a and 15a of the left front side frame 11 and left upper member 15 are positioned side by side along the width direction of the vehicle and are connected with each other.

Mounting portion 37 bulges from the front end portion 11a of the left front side frame 11, while a mounting portion 47 bulges from the front end portion 15a of the left front side frame 15.

Figure 5:
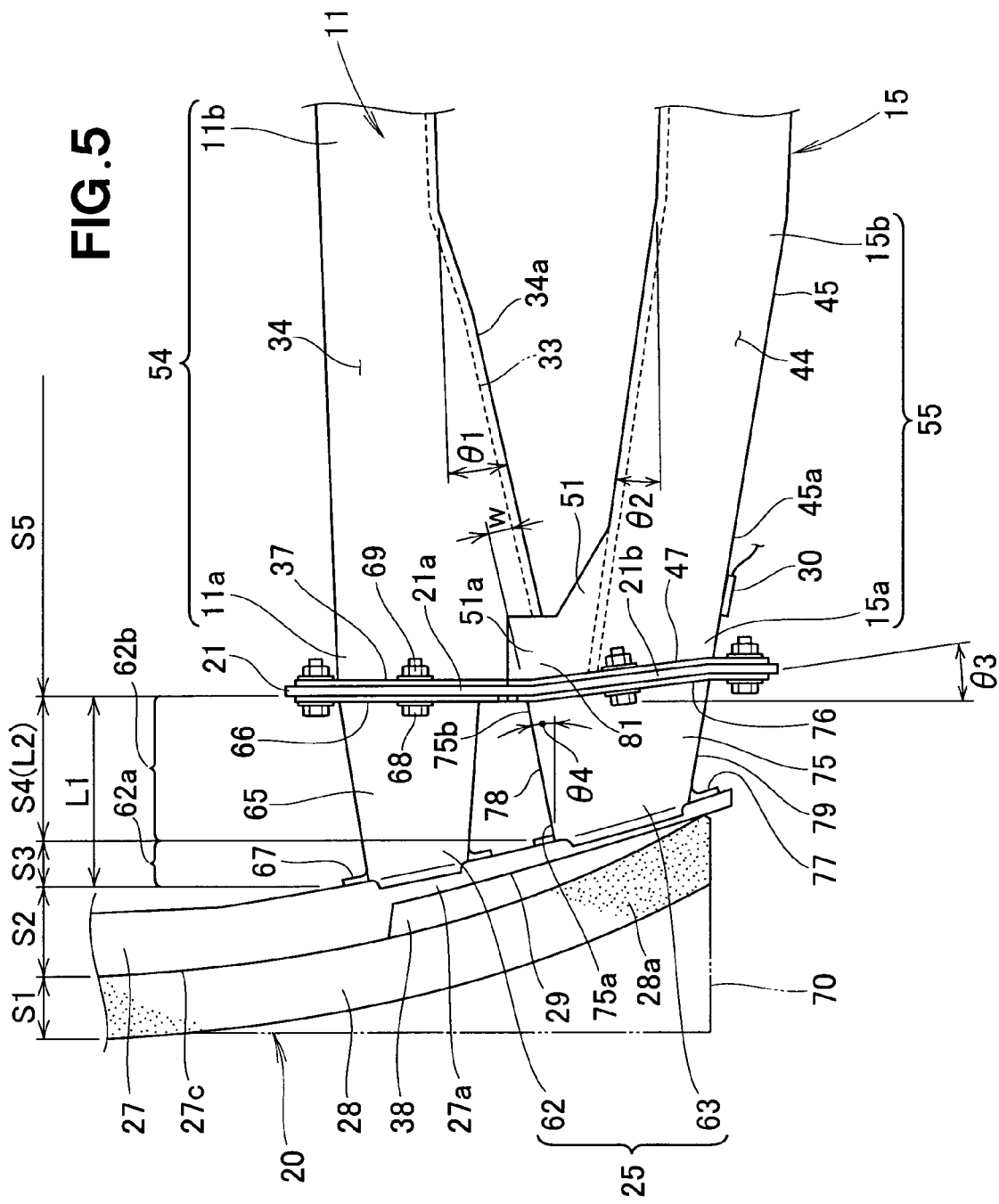
FIG. 5 is a plan view showing principal sections of the first embodiment of the vehicle front body structure.

FIG. 5 is a plan view showing principal sections of the first embodiment of the vehicle front body structure. The upper wall portion 34 of the left front side frame 11 has an outer edge 34a gently slanting laterally outwardly (i.e., toward the left upper member 15) at a slanting angle $\theta 1$ from a substantial longitudinally-middle portion 11b of the left front side frame 11 toward the front end portion 11a. Namely, the upper wall portion 34 is shaped to gradually increase in width from the substantial longitudinally-middle portion 11b toward the front end portion 11a as viewed in plan.

As shown in FIGS. 4A-5, the lower wall portion 36 of the left front side frame 11 also has an outer edge gently slanting laterally outwardly at the slanting angle $\theta 1$ from the substantial longitudinally-middle portion of the left front side frame 11 toward the front end portion.

Further, the outer side wall 33 slants, along the outer edge 34a, laterally outwardly (i.e., toward the left upper member 15) at the slanting angle $\theta 1$ from the substantial longitudinally-middle portion 11b of the left front side frame 11 toward the front end portion 11a. Hereinafter, of the left front side frame 11, a region from the substantial longitudinally-middle portion 11b to the front end portion 11a will be referred to as "front-half side frame region 54".

The left upper member 15 slants laterally inwardly toward the longitudinal centerline at a slanting angle $\theta 2$ from a substantial longitudinally-middle portion 15b toward the front end portion 15a. Hereinafter, of the left upper member 15, a region from the substantial longitudinally-middle portion 15b to the front end portion 15a will be referred to as "front-half upper member region 55".

Because the outer side wall 33 of the left front side frame 11 slants at the slanting angle $\theta 1$ in the front-half side frame region 54 and the front-half upper member region 55 of the left upper member 15 slants at the slanting angle $\theta 2$ as noted above, the front end portion 11a of the front side frame 11 and the front end portion 15a of the upper member 15 are disposed close to each other.

Further, in the upper member 15, as noted above, the upper wall portion 44 has the upward bulge 51, and the lower wall portion 46 has the downward bulge 52 (see FIGS. 4A and 4B). The upward bulge 51 has the distal end region 51a fixed by welding to the upper surface of the upper wall portion 34 of the side frame member 31, and the downward bulge 52 has the distal end region 52a fixed by welding to the lower surface of the lower wall portion 36 of the side frame member 31.

In the aforementioned manner, the front end portion 11a of the front side frame 11 and the front end portion 15a of the upper member 15 are firmly connected with each other.

Further, the left impact absorbing unit 25 is connected to the front end portions 11a and 15a via the left mounting plate 21, and the bumper beam 27 is fixedly connected at the left end portion 27a to the left impact absorbing unit 25.

Further, the left impact absorbing unit 25 includes an inner impact absorbing section 62 connected to the front end portion 11a of the front side frame 11 via the left mounting plate 21, and an outer impact absorbing section 63 connected to the front end portion 15a of the left upper member 15 via the left mounting plate 21.

The left mounting plate 21 has an inner mounting section 21a connected to the front end portion 11a, and an outer mounting section 21b connected to the front end portion 15a.

The inner mounting section 21a extends in parallel to the width direction of the vehicle body, and the outer mounting section 21b slants rearwardly at an angle $\theta 3$ relative to the inner mounting section 21a.

The inner impact absorbing section 62 comprises a cylindrical member 65 of a generally rectangular sideways shape, a rear flange 66 formed at the rear end of the cylindrical member 65, and a front mounting portion 67 formed at the front end of the cylindrical member 65. The cylindrical member 65 tapers toward the front of the vehicle body as viewed in plan.

The inner impact absorbing section 62 is secured at the rear flange 66 to the mounting portion 37 of the left front side frame 11, via the inner mounting section 21a of the left mounting plate 21, by means of bolts 68 and nuts 69. Thus, the inner impact absorbing section 62 is fixedly disposed forwardly of the left front side frame 11. The inner impact absorbing section 62 projects forward from the left mounting plate 21 by a projecting length L1.

The outer impact absorbing section 63 comprises a cylindrical member 75 of a generally rectangular sideways shape, a rear flange 76 formed at the rear end of the cylindrical member 75, and a front mounting portion 77 formed at the front end of the cylindrical member 75. The outer impact absorbing section 63 is spaced laterally outwardly from the inner impact absorbing section 62 by a predetermined distance.

The outer impact absorbing section 63 is secured at the rear flange 76 to the mounting portion 47 of the left upper member 15, via the outer mounting section 21b of the left mounting plate 21, by means of bolts 68 and nuts 69. Thus, the outer impact absorbing section 63 is fixedly disposed forwardly of the left upper member 15. The outer impact absorbing section 63 projects forward from the left mounting plate 21 by a projecting length L2.

In the left impact absorbing unit 25, the projecting length L2 of the outer impact absorbing section 63 is different from, i.e. smaller than, the projecting length L1 of the inner impact absorbing section 62; that is, the inner impact absorbing section 62 projects forward by a greater length than the outer impact absorbing section 63. Further, a portion 62a of the inner impact absorbing section 62, projecting forward beyond the outer impact absorbing section 63, is deformable to absorb impact energy caused by a low-speed collision. Impact energy caused by a high-speed collision can be absorbed by deformation of the inner and outer impact absorbing sections 62 and 63.

In the instant embodiment, the left end portion 27a of the bumper beam 27 is curved rearwardly with aesthetic or design quality etc. taken into account, and thus, the end portion 27a would be located closer to the left mounting plate 21. This is why the outer mounting section 21b is constructed to slant rearwardly at the angle θ3 relative to the inner mounting section 21a as noted above so that a substantially uniform distance can be secured between the left end portion 27a and the outer mounting section 21b. In this way, inner and outer side wall portions 78 and 79 of the outer impact absorbing section 63 can have generally the same length, and thus, the outer impact absorbing section 63 can exhibit good collapsing margin behavior.

In the cylindrical member 75 of the outer impact absorbing section 63, the inner side wall portion 78 slants laterally inwardly at a slanting angle θ4 from a front end portion 75a to a rear end portion 75b. The slanting angle θ4 is substantially equal to the slanting angle θ1 of the outer edge 34a of the front side frame 11 (namely, θ4≈θ1).

In addition, in an area where the left mounting plate 21 is provided, the inner side wall portion 78 of the cylindrical member 75 is located closer to the longitudinal centerline 48, extending centrally through the width of the vehicle body, (FIG. 2) than the outer side wall 33 of the left front side frame 11. Thus, the rear end portion 75b of the cylindrical member 75 and the front end portion 11a of the left front side frame 11 together constitute a partly-overlapping section 81.

More specifically, of the rear end portion 75b of the cylindrical member 75, a region adjacent to the inner side wall portion 78 overlaps a region of the front end portion 11a of the left front side frame 11 adjacent to the outer side wall 33, with the left mounting plate 21 interposed between the two regions.

The region of the rear end portion 75b adjacent to the inner side wall portion 78 and the region of the front end portion 11a adjacent to the outer side wall 33 overlap each other over an overlapping width W. The overlapping width W is determined such that, when another vehicle has collided against the vehicle in question with an offset leftward from the longitudinal centerline 48, an impact load caused by the offset collision can be efficiently transmitted along the inner side wall portion 78 to the outer side wall 33.

The left end portion 27a of the bumper beam 27 is welded to the front mounting portion 67 of the inner impact absorbing section 62 and front mounting portion 77 of the outer impact absorbing section 63. The left end portion 27a of the bumper beam 27 is curved rearwardly toward the vehicle body and is recessed in its front region to provide a fragile portion 29. The energy absorbing member 28 is fixed to a front surface 27c of the bumper beam 27.

The energy absorbing member 28, which is in the form of a resin-made beam, has its left end portion 28a positioned along the recessed, front fragile portion 29 of the bumper beam 27. As noted above, the left end portion 27a of the bumper beam 27 is curved rearwardly toward the vehicle body and has the recessed fragile portion 29 in its front region. Thus, the left end portion 27a of the bumper beam 27 can be located even closer to the vehicle body.

Thus, the left end portion 28a can be positioned along the fragile region 29 in a shape considerably bent rearward toward the vehicle body. In this way, there is secured a relatively great space 70 in front of the left end portion 28a of the energy absorbing member 28, the reason for which will be later detailed with reference to FIGS. 9A and 9B. Left lid member 38 is provided between the fragile portion 29 of the bumper beam 27 and the left end portion 28a of the energy absorbing member 28.

Next, with reference to FIGS. 6A and 6B, a description will be given about a principle in which the impact absorbing structure 20 employed in the first embodiment absorbs impact energy caused by a low-speed offset collision.

Namely, when another vehicle 85 has lightly collided against a left end portion 28a of the energy absorbing member 28 with a leftward offset from the longitudinal centerline, extending centrally-through the width of the vehicle body, as shown in FIG. 6A, an impact load F1 caused by the light (low-speed) offset collision is transmitted to the left impact absorbing unit 25 by way of the left end portion 28a of the energy absorbing member 28 and left end portion 27a of the bumper beam 27. More specifically, the impact load F1 is transmitted to the inner impact absorbing section 62 as indicated by arrow A and transmitted to the outer impact absorbing section 63 as indicated by arrow B.

Then, the left end portion 28a of the energy absorbing member 28 and left end portion 27a of the bumper beam 27 are collapsed by the impact load F1, so that part of the impact load F1 is absorbed by the end portions 28a and 27a. The remaining or residual part of the impact load F1 is absorbed by the left impact absorbing unit 25 (i.e., inner and outer impact absorbing sections 62 and 63) being collapsed by the impact load.

Thus, in the case of the light (low-speed) offset collision, the impact load F1 (namely, impact energy) can be absorbed without the left front side frame 11 and left upper member 15 being deformed. Consequently, after the light offset collision, the vehicle body only has to be subjected to a simple repair where just the bolts 68 are removed to replace the energy absorbing member 28, bumper beam 27 and absorbing unit 25 with new ones.

Next, with reference to FIGS. 7A, 7B and 8, a description will be given about a principle in which the impact absorbing structure 20 employed in the first embodiment absorbs impact energy caused by a high-speed offset collision.

Figure 7A:
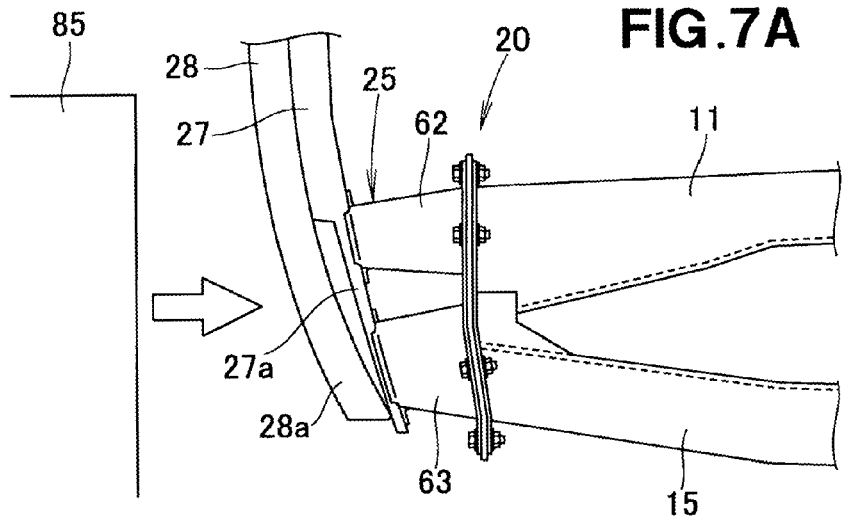
FIGS. 7A and 7B are views explanatory of a principle in which the impact absorbing structure employed in the first embodiment absorbs impact energy caused by a high-speed offset collision.
Figure 7B:
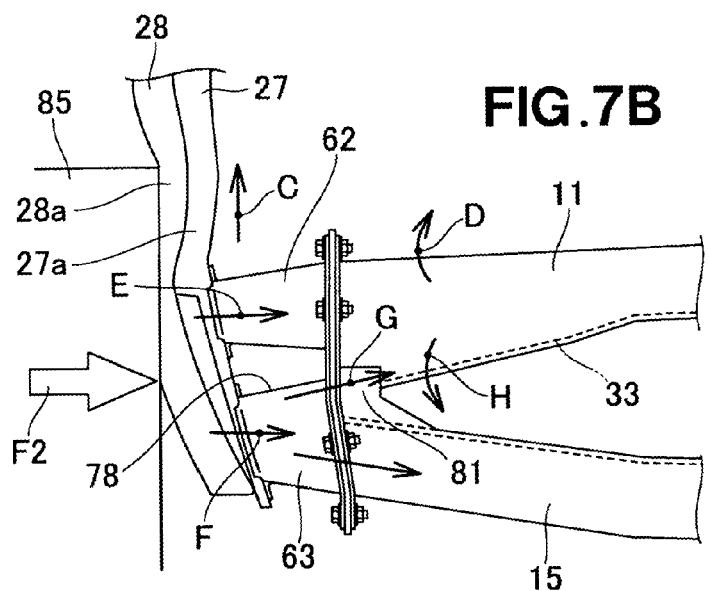

Namely, when another vehicle 85 has heavily collided against the left end portion 28a of the energy absorbing member 28 with a leftward offset from the centerline (high-speed offset collision) as shown in FIG. 7A, the left end portion 28a of the energy absorbing member 28 and left end portion 27a of the bumper beam 27 are collapsed by an impact load F2 as shown in FIG. 7B. Because of the deformation of the left end portion 27a of the bumper beam 27, the impact load F2 acts on the left end portion 27a in a direction toward the longitudinal centerline 48 as indicated by arrow C. Such an impact load acts on the left front side frame 11, by way of the inner impact absorbing section 62, in a direction to deform the frame as indicated by arrow D.

Meanwhile, the impact load F2 caused by the high-speed collision is transmitted, by way of the left end portion 28a of the energy absorbing member 28 and left end portion 27a of the bumper beam 27, to the inner impact absorbing section 62 as indicated by arrow E and to the outer impact absorbing section 63 as indicated by arrow F.

Because the inner side wall portion 78 of the outer impact absorbing section 63 and the outer side wall 33 of the left front side frame 11 together constitute the partly-overlapping section 81, part of the impact load applied to the outer impact absorbing section 63 can be efficiently transmitted along the inner side wall portion 78 to the outer side wall 33 as indicated by arrow G. This impact load would act in a direction to deform the left front side frame 11 as indicated by arrow H (i.e., in an opposite direction from arrow D).

In this way, the impact load that would act to bend the left front side frame 11 toward the longitudinal centerline 48 as indicated by arrow D can be canceled out by the impact load transmitted to the outer side wall 33 of the left front side frame 11. As a result, the instant embodiment can reliably prevent the left front side frame 11 from being bent in the arrow D direction, thereby achieving sufficient rigidity of the left front side frame 11 against bending without provision of a particular reinforcing member, such as a stiffener, as well as reduction in weight of the front side frame 11.

Figure 8:
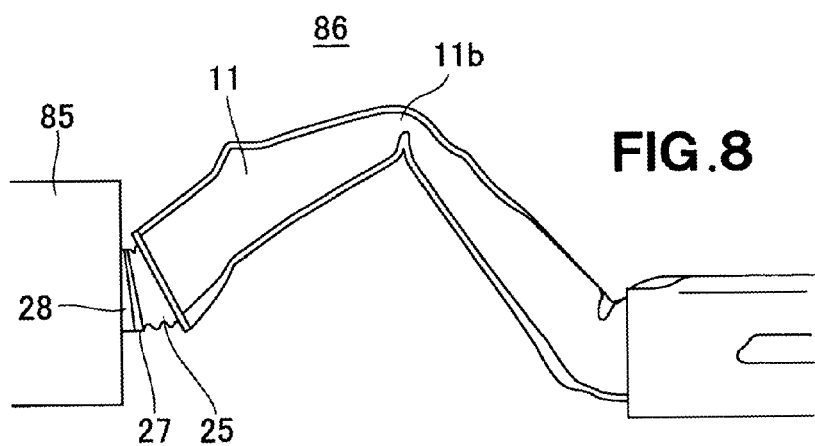
FIG. 8 is a view showing in more detail how the impact absorbing structure employed in the first embodiment absorbs impact energy caused by the high-speed offset collision.

FIG. 8 is a view explanatory of how the impact absorbing structure 20 employed in the first embodiment absorbs impact energy caused by a high-speed offset collision. Because the left front side frame 11 can be prevented from being bent in the arrow D direction (see FIG. 7B), the instant embodiment allows the left front side frame 11 to be deformed into an appropriately collapsed state. More specifically, the instant embodiment allows a substantial longitudinally-middle portion 11b of the left front side frame 11 to be deformed into a generally doglegged collapsed shape, so that the impact load can be efficiently absorbed.

Because the left front side frame 11 can be deformed into a generally doglegged collapsed shape as noted above, the left front side frame 11 can function as a crushable zone that allows an engine room 86 to be collapsed in an appropriate manner.

In the aforementioned manner, the instant embodiment can secure a sufficient deformation amount of the left and right front side frames 11 and 12, to thereby effectively prevent deformation of a vehicle compartment located behind the engine room 86.

Figure 9A:
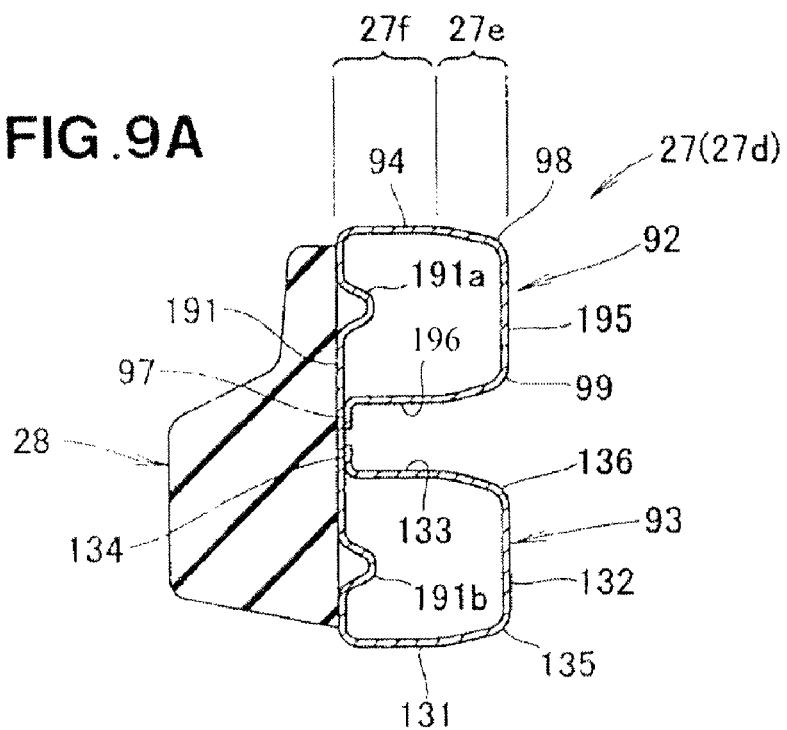
FIG. 9A is a sectional view taken along line 9a-9a of FIG. 2.
Figure 9B:
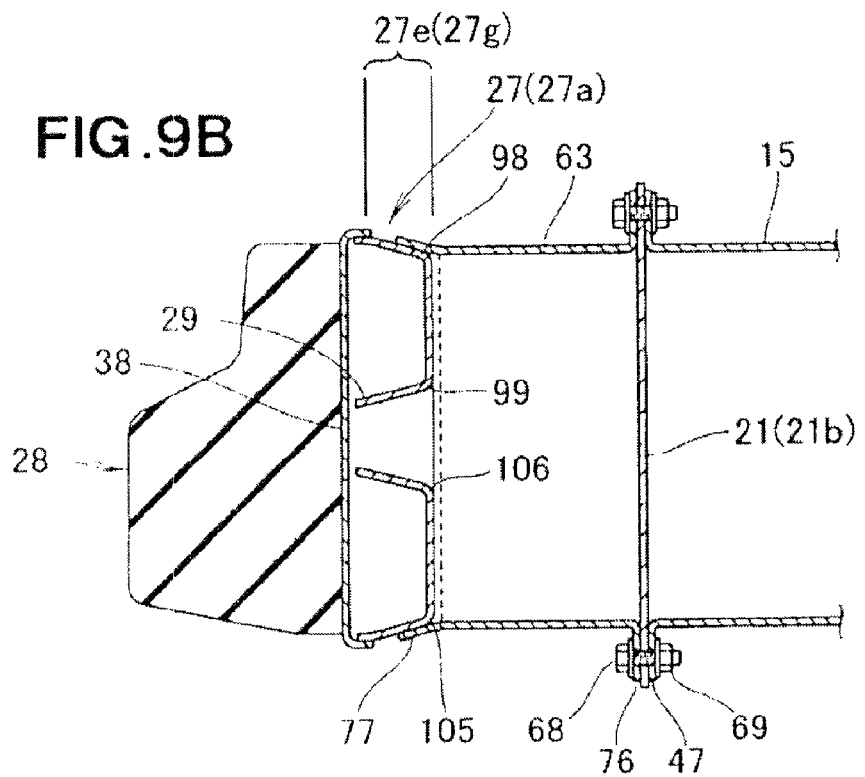
FIG. 9B is a sectional view taken along line 9b-9b of FIG. 2.

FIG. 9A is a sectional view taken along the 9a-9a line of FIG. 2, and FIG. 9B is a sectional view taken along the 9b-9b line of FIG. 2. As shown in FIG. 9A, the bumper beam 27 includes a vertical front wall section 191 provided by forming a middle region, in the width direction of the vehicle body, of the bumper beam 27 to extend vertically, an upper laterally-facing C section 92 covering a substantial upper half region of the front wall section 191, and a lower laterally-facing C section 93 covering a substantial lower half region of the front wall section 191.

The vertical front wall section 191 has an upper rearward rib 191a formed near the upper end thereof and a lower rearward rib 191b formed near the lower end thereof.

The upper laterally-facing C section 92 has an upper portion 94 bent rearward from the upper end of the vertical front wall section 191, an upper rear portion 195 bent downward from the rear end of the upper portion 94, an upper middle portion 196 bent forward from the lower end of the upper rear portion 195, and an upper joint portion 97 bent downward from the front end of the upper middle portion 196 and joined to a vertically-middle region of the vertical front wall section 191.

Upper ridge 98 is defined by the rear end of the upper portion 94 and the upper end of the upper rear portion 195, and an upper middle ridge 99 is defined by the lower end of the upper rear portion 195 and the rear end of the upper middle portion 196. Hereinafter, the upper ridge 98 will be referred to as "upper high strength portion", while the upper middle ridge 99 will be referred to as "upper middle high strength portion".

The lower laterally-facing C section 93 has a lower portion 131 bent rearward from the lower end of the vertical front wall section 191, a lower rear portion 132 bent upward from the rear end of the upper portion 131, a lower middle portion 133 bent forward from the upper end of the lower rear portion 132, and a lower joint portion 134 bent upward from the front end of the lower middle portion 133 and joined to the vertically-middle region of the vertical front wall section 191.

Lower ridge 135 is defined by the rear end of the lower portion 131 and the lower end of the lower rear portion 132, and a lower middle ridge 136 is defined by the upper end of the lower rear portion 102 and the rear end of the lower middle portion 133. Hereinafter, the lower ridge 135 will be referred to as "lower high strength portion", while the lower middle ridge 136 will be referred to as "lower middle high strength portion".

Namely, the upper high strength portion 98, upper middle high strength portion 99, lower high strength portion 135 and lower middle strength portion 136 are provided on a rear half region 27e of the bumper beam 27.

As seen in FIG. 9B, the left end portion 27a of the bumper beam 27 is recessed in its front half region 27f (see FIG. 9A) to provide the above-mentioned fragile portion 29. The upper high strength portion 98, upper middle high strength portion 99, lower high strength portion 135 and lower middle strength portion 136 are also provided on a rear half region 27g at and near the left end portion 27a of the bumper beam 27.

The front mounting portion 77 of the outer impact absorbing section 63 is joined to the outer surface of the rear half region 27g of the left end portion 27a, as seen in FIG. 3. Further, the front mounting portion 67 of the inner impact absorbing section 62 is joined to the outer surface of the rear half region 27g of the left end portion 27a, as also seen in FIG. 3.

Thus, the rear half region 27g of the left end portion 27a is supported by the inner and outer impact absorbing sections 62 and 63. As a consequence, the inner and outer impact absorbing sections 62 and 63 can be strongly integrally joined together by the rear half region 27g having the upper high strength portion 98, upper middle high strength portion 99, lower high strength portion 135 and lower middle strength portion 136.

The left and right end portions 27a and 27b of the bumper beams 27 shown in FIG. 2 are disposed and constructed in left-right symmetrical relation to each other, and thus, the end portion 27a will be primarily or representatively described in detail below with a detailed description of the right end portion 27b omitted. Similarly, the left and right end portions 28a and 28b of the energy absorbing member 28 shown in FIG. 2 are disposed and constructed in left-right symmetrical relation to each other, and thus, the left end portion 28a will be primarily or representatively described in detail below with a detailed description of the right end portion 28b omitted.

Referring back to FIG. 1, the left acceleration sensor 30 is provided on a front end region 45a of the outer side wall portion 45 of the left upper member 15. Of the left upper member 15, the front end region 45a of the outer side wall portion 45 is located close to the outer impact absorbing section 63 but remote from the inner impact absorbing section 62.

The left acceleration sensor 30 is provided for detecting acceleration (deceleration) G when an impact load has been applied to the inner and outer impact absorbing sections 62 and 63. The acceleration detected by the left acceleration sensor 30 is supplied to a control section 110.

The control section 110 determines whether the acceleration detected by the left acceleration sensor 30 has exceeded a prestored (or preset) airbag-deploying acceleration threshold value Gs. If so (i.e., with an affirmative determination), the control section 110 gives a deployment signal to an airbag device 112.

In response to the deployment signal given from the control section 110, the airbag device 112 deploys an airbag 113 to protect the human driver (not shown). The airbag 113 is contained in a steering wheel 114 in a folded storage position, and an inflator (not shown) is also contained in the steering wheel 114. In response to the deployment signal given from the control section 110, gas is supplied from the inflator into the airbag 113 to deploy or develop the airbag 113.

Now, with primary reference to FIGS. 5 and 10, a description will be given about how an appropriate airbag-deploying acceleration threshold value Gs is set in the instant embodiment. FIG. 10 is a graph showing acceleration produced when impact energy has acted on the instant embodiment of the vehicle front body structure.

When another vehicle has heavily collided against the front impact absorbing structure 20 of the vehicle in question with a leftward offset from the longitudinal centerline, impact energy first acts on the energy absorbing member 28 so that acceleration G1 is produced in the vehicle. At that time, the energy absorbing member 28 is collapsed (deformed) by a stroke length S1 so that impact energy E1 is absorbed by the energy absorbing member 28.

By the energy absorbing member 28 being collapsed as noted above, residual impact energy acts on the bumper beam 27 so that acceleration G2 is produced in the vehicle. Thus, the bumper beam 27 is collapsed (deformed) by a stroke length S2 so that impact energy E2 is absorbed by the energy absorbing member 28.

As noted above, the projecting length L2 of the outer impact absorbing section 63 is chosen to be different from, i.e. smaller than, the projecting length L1 of the inner impact absorbing section 62. Because of the different projecting lengths L1 and L2, the collapsing deformation of the bumper beam 27 causes the residual impact energy to first act on the portion 62a of the inner impact absorbing section 62, projecting forward beyond the outer impact absorbing section 63, so that acceleration G3 is produced in the vehicle.

Consequently, the forward projecting portion 62a of the inner impact absorbing section 62 is collapsed (deformed) by a stroke length S3 so that impact energy E3 is absorbed by the energy absorbing member 28. By the collapsing deformation of the forward projecting portion 62a of the inner impact absorbing section 62, the deformation of the absorbing section 62 is transmitted to or reaches the outer impact absorbing section 63.

Thus, the residual impact energy is borne by both of the inner and outer impact absorbing sections 62 and 63. Because impact energy is borne by the two impact absorbing sections 62 and 63, great impact energy can be borne, so that increased acceleration G4 of the vehicle can be produced. Consequently, the residual impact energy acts on a remaining portion 62b of the inner impact absorbing section 62 and outer impact absorbing section 63, so that great acceleration G4 is produced in the vehicle; that is, the acceleration in the vehicle increases sharply at this point.

Therefore, a value of acceleration Gs in between the acceleration G3 and acceleration G4 is set as the airbag-deploying acceleration threshold value Gs in the instant embodiment. Namely, the airbag-deploying acceleration threshold value Gs can be set within a range of a great acceleration change rate (i.e., range of a clear acceleration change rate Gd) which presents a sharp increase in the acceleration.

Because the clear acceleration change rate Gd is achieved between the acceleration level G3 and the acceleration level G4 and an appropriate airbag-deploying acceleration threshold value Gs is set within the range of the clear acceleration change rate Gd, the control section 110 can accurately determine, on the basis of the thus-set airbag-deploying acceleration threshold value Gs, proper timing (or acceleration level) at which the airbag is to be deployed.

Note that the "acceleration change rate Gd" means a difference between the acceleration level G3 when the impact energy is absorbed by the inner impact absorbing section 62 alone and the acceleration level G4 when the impact energy is absorbed by both of the inner and outer impact absorbing sections 62 and 63.

As noted above, the left acceleration sensor 30 is provided on the front end region 45a of the outer side wall portion 45 of the left upper member 15 (see FIG. 3) and the front end region 45a of the outer side wall portion 45 is located close to the outer impact absorbing section 63 but remote from the inner impact absorbing section 62. Because the inner impact absorbing section 62 is provided on the front end portion 11a of the left front side frame 11, the inner impact absorbing sections 62 is located at a relatively great distance from the front end region 45a of the left upper member 15.

Thus, during the deformation of the portion 62a of the inner impact absorbing section 62 projecting forward beyond the outer impact absorbing section 63, the impact energy would not readily transmit to the front end region 45a of the left upper member 15, so that the acceleration G3 produced in the front end region 45a of the left upper member 15 is relatively small.

The outer impact absorbing section 63, on the other hand, is provided on the upper member 15 at a position close to the front end region 45a, and thus, during the deformation of the outer impact absorbing section 63, the impact energy can be efficiently transmitted to the position of the upper member 15 close to the front end region 45*a*. Consequently, once the outer impact absorbing section 63 starts deforming, great acceleration G4 can be produced in the front end region 45*a*.

By the great acceleration G4 being produced in the aforementioned manner, a great (and hence clear) acceleration change rate Gd can be achieved even more reliably between the acceleration level G3 and the acceleration level G4. Thus, by the provision of the acceleration sensor 30 on the front end portion 45*a*, the instant embodiment can accurately determine, on the basis of the thus-set airbag-deploying acceleration threshold value Gs, proper timing (or acceleration level) at which the airbag is to be deployed.

As noted above, the residual impact energy acts on the remaining portion 62*b* of the inner impact absorbing section 62 and outer impact absorbing section 63, and thus, the remaining portion 62*b* of the inner impact absorbing section 62 and outer impact absorbing section 63 are collapsed (deformed) by a stroke length S4. Consequently, impact energy E4 is absorbed by the remaining portion 62*b* of the inner impact absorbing section 62 and outer impact absorbing section 63.

By the collapsing deformation of the remaining portion 62*b* of the inner impact absorbing section 62 and outer impact absorbing section 63, the residual impact energy acts on the left front side frame 11 and left upper member 15, so that acceleration G5 is produced in the vehicle.

Then, the left front side frame 11 and left upper member 15 are collapsed (deformed) by a stroke length S5, so that impact energy E5 is absorbed by the left front side frame 11 and left upper member 15.

In the aforementioned manner, the impact energy caused by the high-speed collision can be appropriately absorbed.

Figure 11:
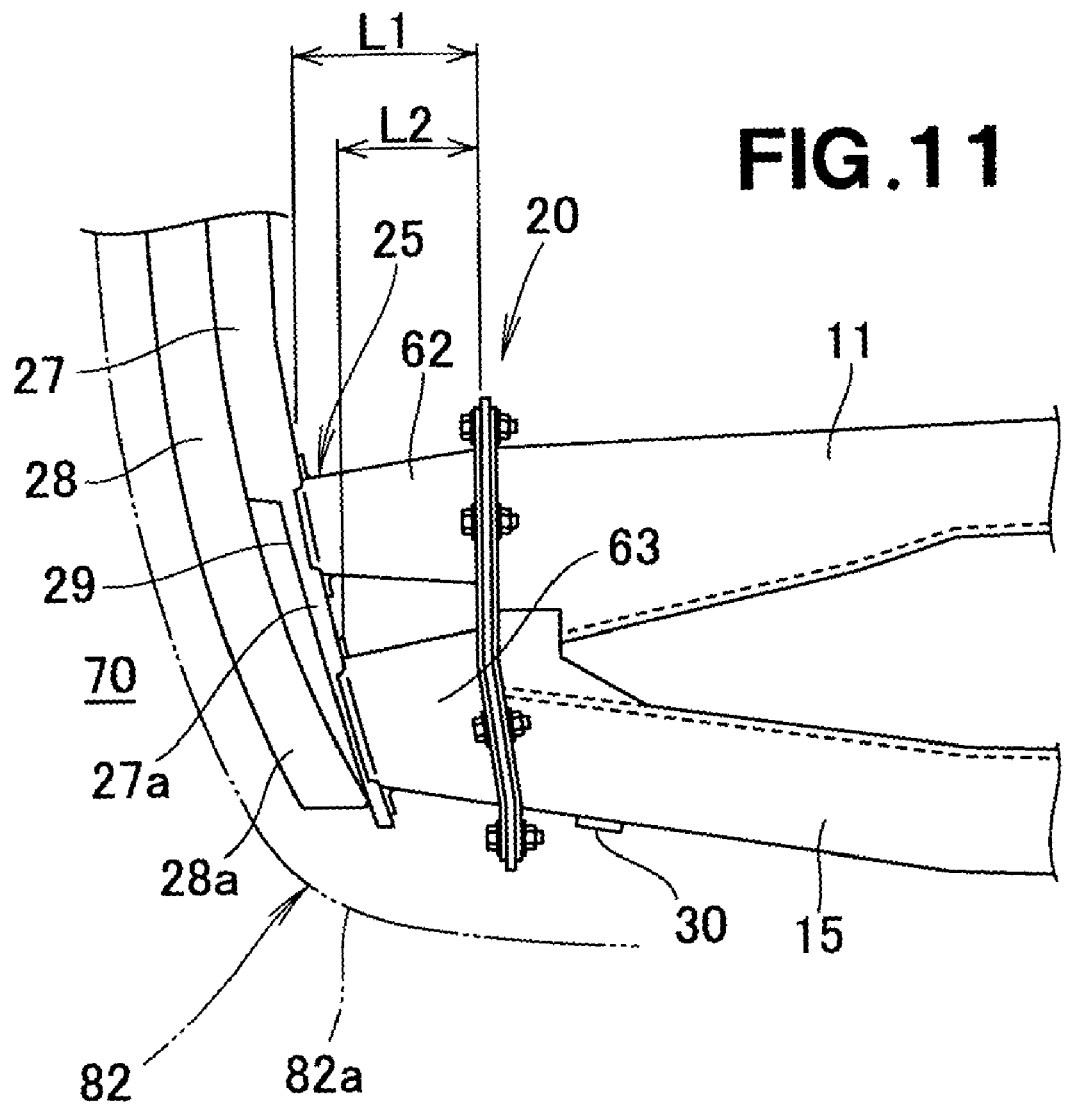
FIG. 11 is a view showing a relatively great space provided in front of a left end portion of an energy absorbing member in the embodiment of the vehicle front body structure.

With reference to FIG. 11, the following lines set forth the reason why the relatively great space 70 can be provided in front of the left end portion 28*a* of the energy absorbing member 28. FIG. 11 is a view showing the relatively great space 70 provided in front of the left end portion 28*a* of the energy absorbing member 28 in the embodiment of the vehicle front body structure.

As noted above, the projecting length L2 of the outer impact absorbing section 63 is smaller than the projecting length L1 of the inner impact absorbing section 62. Thus, the left end portion 27*a* of the bumper beam 27 can be curved toward the vehicle body. Further, the fragile portion 29 is formed in the front surface of the left end portion 27*a*.

Thus, the left end portion 28*a* of the energy absorbing member 28 can be greatly curved rearward toward the vehicle body, so that the relatively great space 70 is provided in front of the left end portion 28*a*. Consequently, a left front corner portion 82*a* of a front section, i.e. bumper face, 82 of the vehicle can be formed in a relatively great curved shape, which can even further enhance the aesthetic or design quality of the vehicle.

Next, with reference to FIGS. 12A and 12B, a more detailed description will be given about a manner in which the impact absorbing structure 20 employed in the first embodiment absorbs impact energy caused by a low-speed offset collision.

Figure 12A:
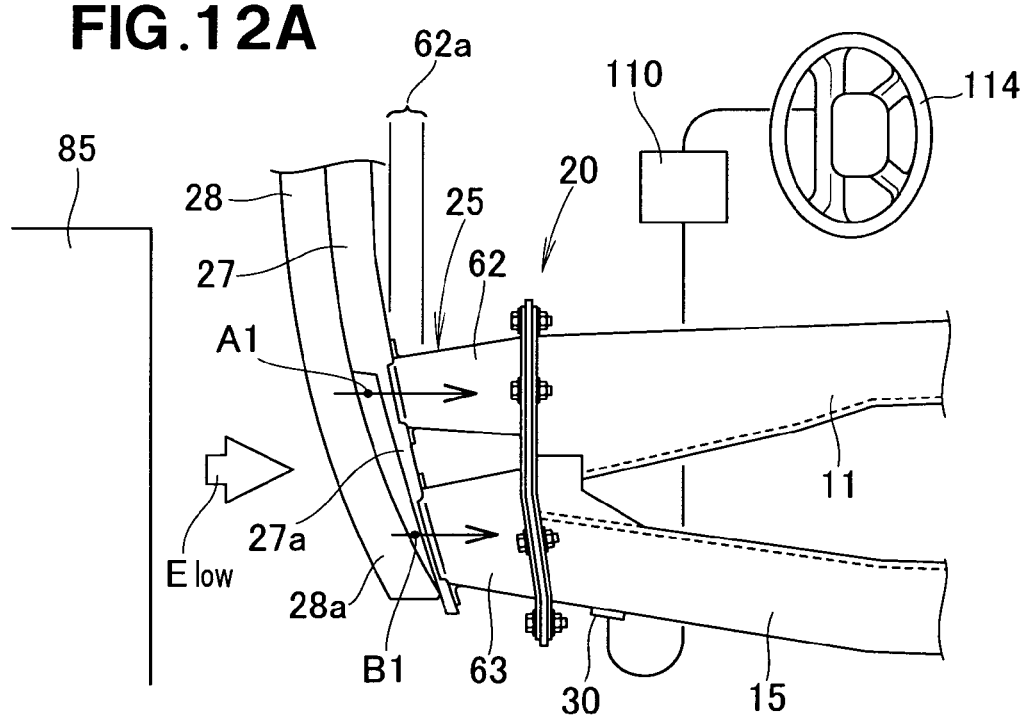
FIGS. 12A and 12B are views showing a manner in which the impact absorbing structure employed in the first embodiment absorbs impact energy caused by a low-speed offset collision.
Figure 12B:
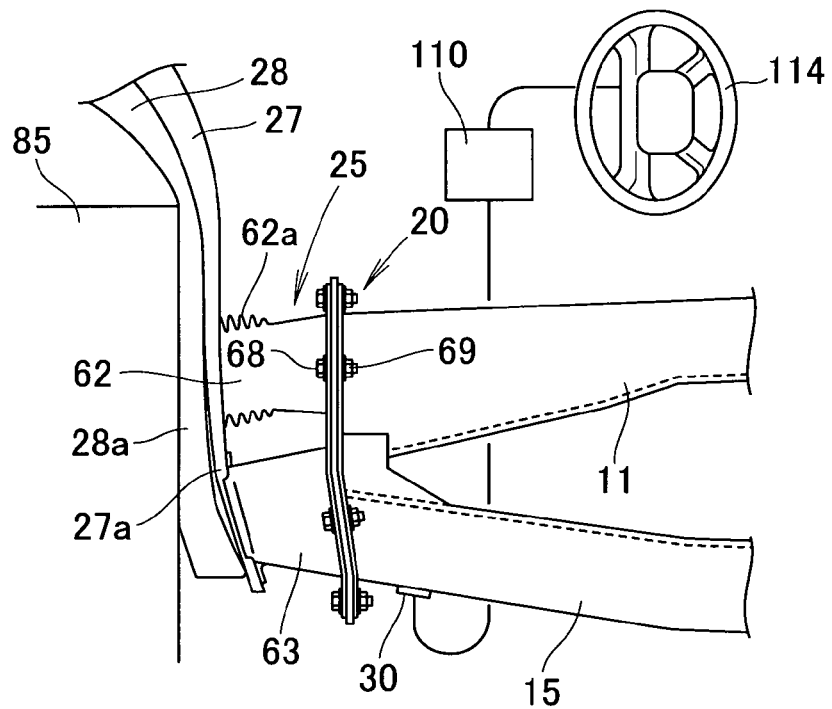

Namely, when another vehicle 85 has lightly collided against the left end portion 28*a* of the energy absorbing member 28 with a leftward offset from the longitudinal centerline 48 (FIG. 2), extending centrally through the width of the vehicle body, as shown in FIG. 12A, impact energy Elow caused by the light (low-speed) offset collision is first transmitted to the left impact absorbing unit 25 by way of the left end portion 28*a* of the energy absorbing member 28 and left end portion 27*a* of the bumper beam 27.

More specifically, the low-speed collision impact energy is transmitted to the inner impact absorbing section 62 as indicated by arrow A1 and transmitted to the outer impact absorbing section 63 as indicated by arrow B1. Because the portion 62*a* of the inner impact absorbing section 62 projects forward beyond the outer impact absorbing section 63, the impact energy acting on the inner impact absorbing section 62 is greater than that acting on the outer impact absorbing section 63.

Thus, the forward projecting portion 62*a* of the inner impact absorbing section 62 is collapsible more easily than the outer impact absorbing section 63. In the case of the low-speed offset collision, the acceleration detected by the left acceleration sensor 30 is smaller than the airbag-deploying acceleration threshold value Gs, and thus, no deployment signal is given from the control section 110 to the airbag device 112 so that, the airbag 113 is left undeployed, i.e. kept in the folded position.

Then, the left end portion 28*a* of the energy absorbing member 28 and left end portion 27*a* of the bumper beam 27 are collapsed by the impact energy, so that part of the impact energy Elow is absorbed by the collapsed end portions 28*a* and 27*a*. The remaining or residual part of the impact energy is absorbed by the collapsing deformation of the forward projecting portion 62*a* of the inner impact absorbing section 62. With such collapsing deformation of the inner impact absorbing section 62, the outer impact absorbing section 63 too might be slightly collapsed (deformed).

Thus, in the case of the light (low-speed) offset collision, the impact energy Elow can be absorbed effectively without the left front side frame 11 and left upper member 15 being undesirably deformed. Consequently, after the light offset collision, the vehicle body only has to be subjected to a simple repair where just the bolts 68 are removed to replace the energy absorbing member 28, bumper beam 27 and left impact absorbing unit 25 with new ones.

Next, with reference to FIGS. 13 and 14 in combination with FIG. 10, a more detailed description will be given about a manner in which the impact absorbing structure 20 employed in the first embodiment absorbs impact energy caused by a high-speed offset collision.

Figure 13A:
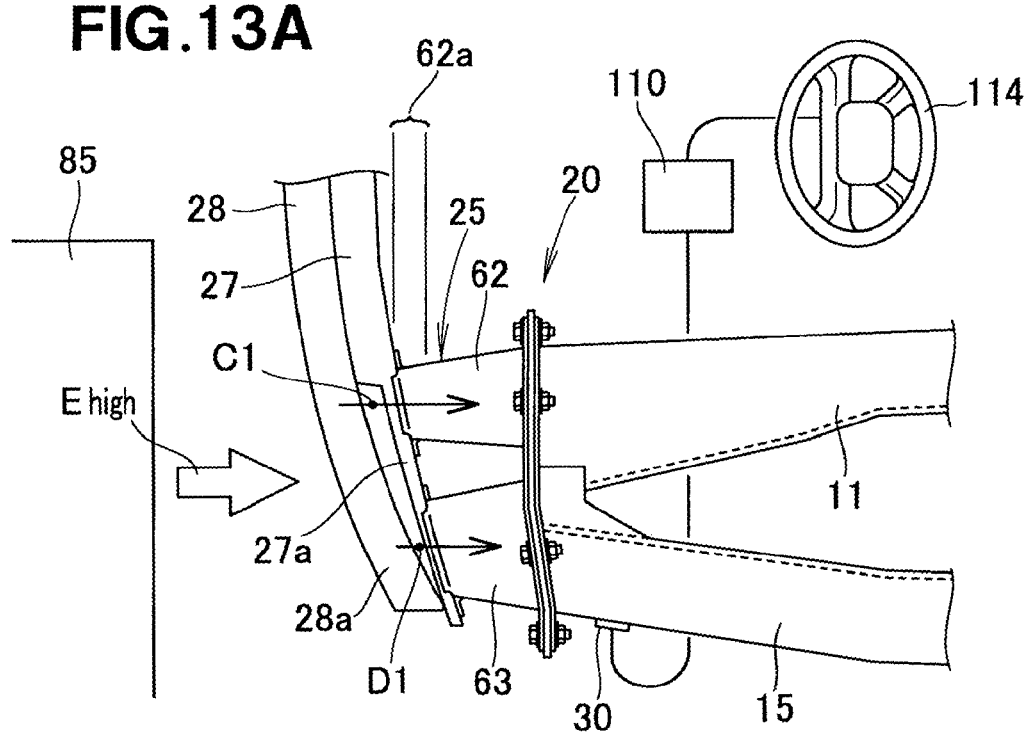
FIGS. 13A and 13B are views explanatory of how the impact absorbing structure employed in the embodiment absorbs impact energy caused by a high-speed offset collision.

Namely, when another vehicle 85 has heavily collided against the left end portion 28*a* of the energy absorbing member 28 with a leftward offset from the longitudinal centerline (high-speed offset collision) as shown in FIG. 13A, the impact energy Ehigh caused by the heavy (high-speed) offset collision is transmitted to the left impact absorbing unit 25 by way of the left end portion 28*a* of the energy absorbing member 28 and left end portion 27*a* of the bumper beam 27.

More specifically, the high-speed collision impact energy is transmitted to the inner impact absorbing section 62 as indicated by arrow C1 and transmitted to the outer impact absorbing section 63 as indicated by arrow D1. Because the portion 62*a* of the inner impact absorbing section 62 projects forward beyond the outer impact absorbing section 63, the impact energy acting on the inner impact absorbing section 62 is greater than that acting on the outer impact absorbing section 63. Thus, the forward projecting portion 62*a* of the inner impact absorbing section 62 is collapsible more easily than the outer impact absorbing section 63.

Figure 13B:
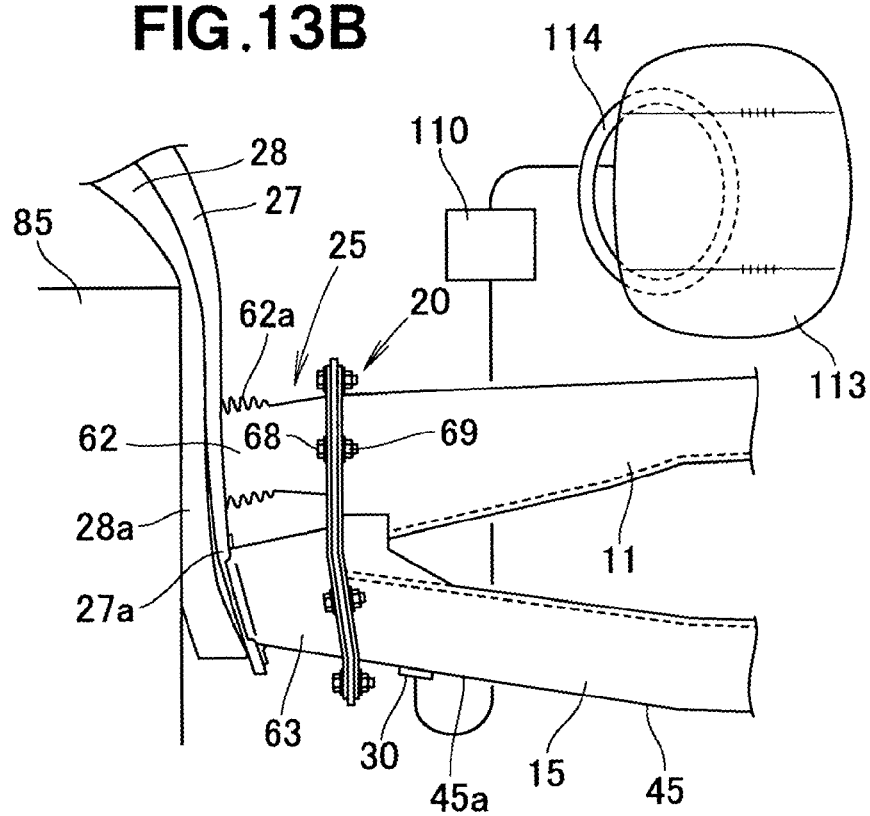

In the case of the high-speed collision, the left end portion 28*a* of the energy absorbing member 28 and left end portion 27*a* of the bumper beam 27 are collapsed as shown in FIG. 13B, to thereby absorb parts (see E1 and E2 in FIG. 10) of the impact energy Ehigh. The remaining or residual part (see E3 in FIG. 10) of the impact energy is absorbed by the collapsing deformation of the forward projecting portion 62a of the inner impact absorbing section 62.

Because the left acceleration sensor 30 is provided on the front end region 45a of the outer side wall portion 45 remote from the inner impact absorbing section 62, the impact energy transmitted to the inner impact absorbing section 62 would not easily transmit to the left acceleration sensor 30. Thus, the acceleration G3 (see FIG. 10) produced in the front end region 45a of the left upper member 15 is relatively small.

The collapsing deformation of the forward projecting portion 62a of the inner impact absorbing section 62 then reaches the outer impact absorbing section 63 to cause collapsing deformation of the outer impact absorbing section 63. Thus, the residual impact energy is borne by the two impact absorbing sections 62 and 63, so that an increased acceleration G4 is produced in the vehicle.

Because of the great acceleration G4, a great (and hence clear) acceleration change rate Gd can be achieved between the acceleration level G3 and the acceleration level G4. In this way, increase in the acceleration of the vehicle can be reliably detected by the left acceleration sensor 30 without being influenced by fluctuation of the acceleration of the vehicle.

The acceleration detected by the left acceleration sensor 30 is supplied to the control section 110. The control section 110 determines whether the acceleration detected by the left acceleration sensor 30 has exceeded the prestored (or preset) airbag-deploying acceleration threshold value Gs. If so (i.e., with an affirmative determination), the control section 110 gives a deployment signal to the airbag device 112. In response to the deployment signal given from the control section 110, the airbag device 112 deploys the airbag 113 to protect the human driver (not shown) in the well-known manner.

Figure 14:
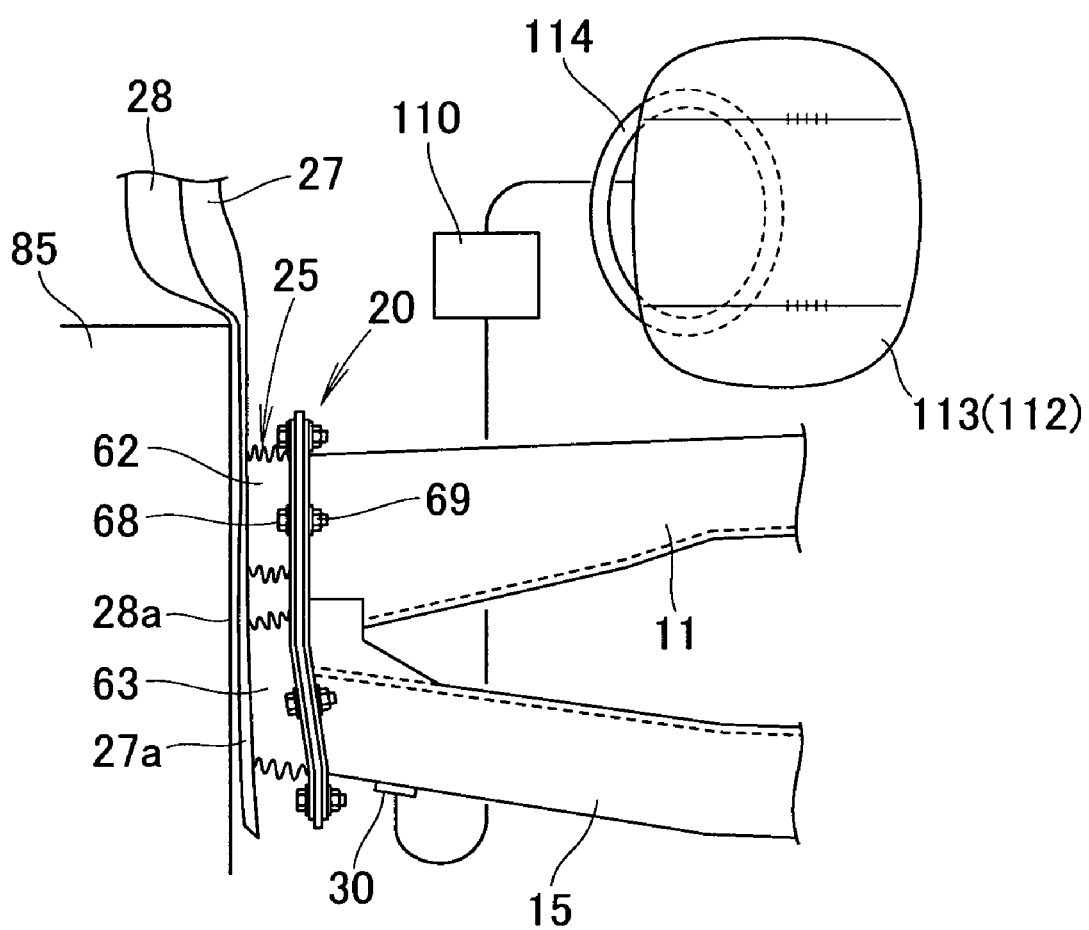
FIG. 14 is a view explanatory of how the impact absorbing structure employed in the embodiment absorbs impact energy caused by a high-speed offset collision.

FIG. 14 is a view explanatory of how the impact absorbing structure 20 employed in the embodiment absorbs impact energy caused by a high-speed offset collision. By the inner and outer impact absorbing sections 62 and 63 being collapsed (deformed) as shown, part of residual impact energy can be absorbed. Then, the left front side frame 11 is deformed into a generally doglegged collapsed shape as shown in FIG. 8, so that impact energy E5 (FIG. 10) can be efficiently absorbed. By being deformed into a generally doglegged collapsed shape as noted above, the left front side frame 11 can function as a crushable zone that allows the engine room 86 to be collapsed in an appropriate manner.

In the aforementioned manner, the instant embodiment can secure a sufficient deformation amount of the left and right front side frames 11 and 12, to thereby effectively prevent deformation of the vehicle compartment located behind the engine room 86.

Further, because, on each of the left and right sides of the vehicle body, the projecting length L2 of the outer impact absorbing section 63 is smaller than the projecting length L1 of the inner impact absorbing section 62 (i.e., the inner impact absorbing section 62 projects forward by a greater length than the outer impact absorbing section 63), there can be provided a clear acceleration change rate Gd between the acceleration level G3 when the impact energy is absorbed by the inner impact absorbing section 62 and the acceleration level G4 when the impact energy is absorbed by both of the inner and outer impact absorbing sections 62 and 63. By setting the airbag-deploying acceleration threshold value Gs within the range of such a clear acceleration change rate Gd in the vehicle having left and right front corner portions 82a of the bumper face 82, the instant embodiment can achieve optimized deployment of the airbag 113.

Next, with reference to FIGS. 15-19, a description will be given about a second embodiment of the vehicle front body structure 90. Similar elements to those in the first embodiment 10 are indicated by the same reference numerals and characters as used for the first embodiment 10 and will not be described here to avoid unnecessary duplication.

Figure 15:
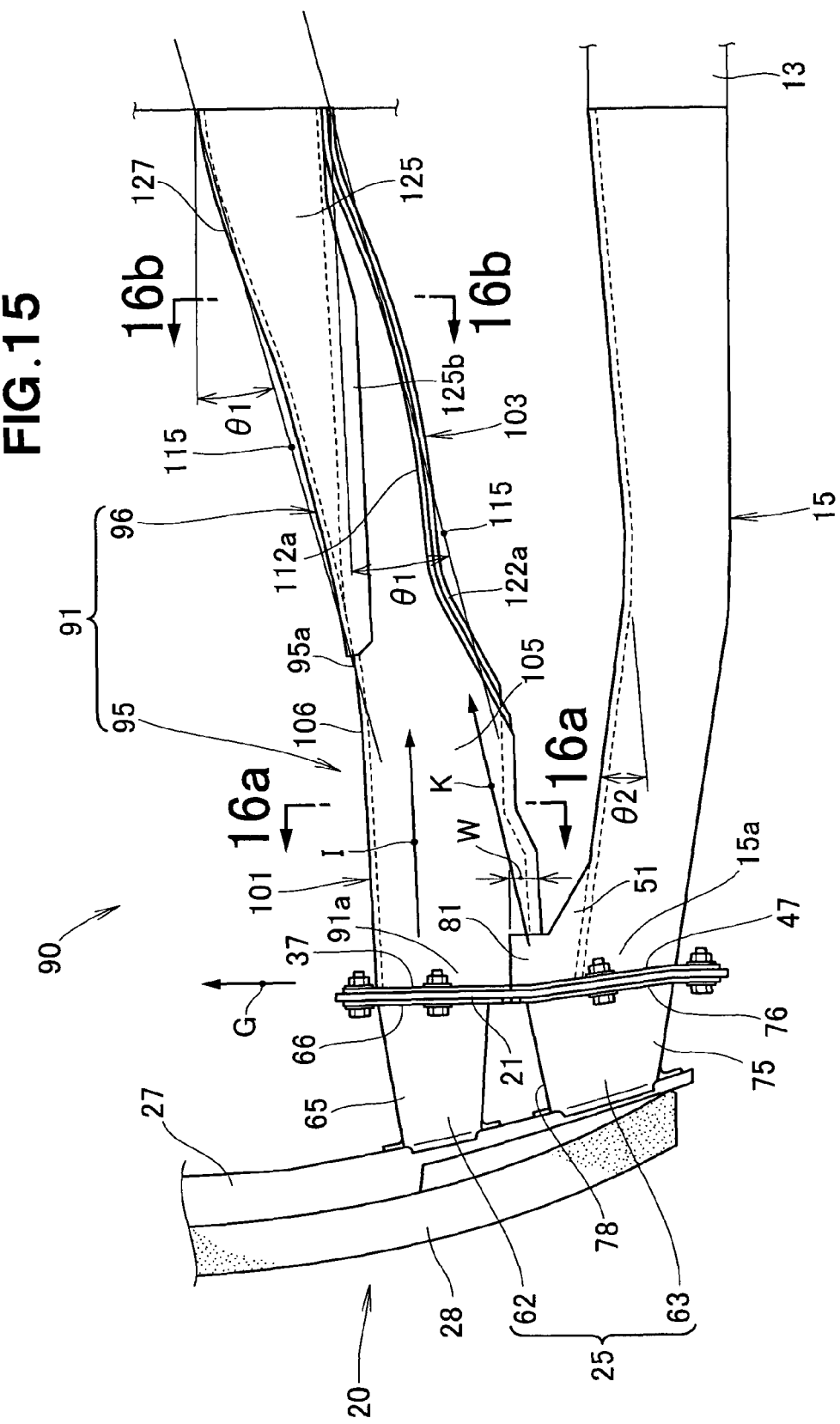
FIG. 15 is a plan view showing principal sections of a second embodiment of the vehicle front body structure of the present invention.
Figure 16A:
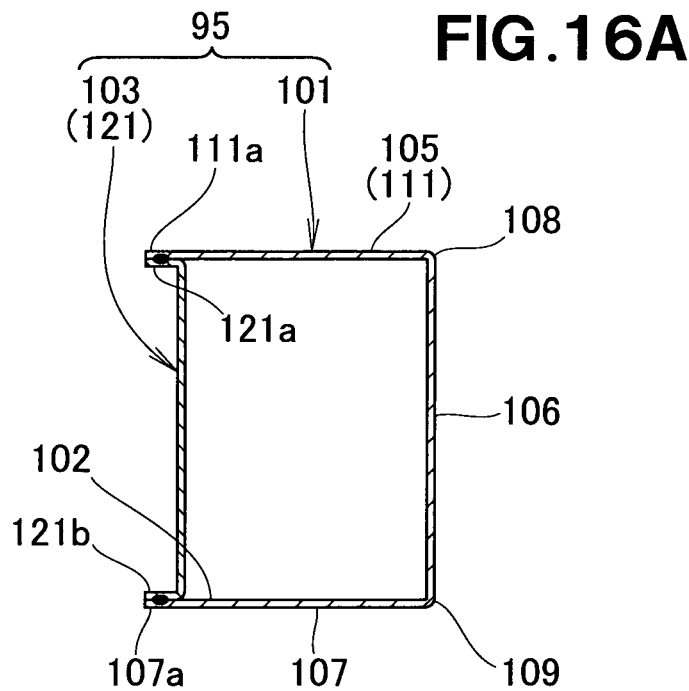
FIG. 16A is a sectional view taken along line 16a-16a of FIG. 15.
Figure 16B:
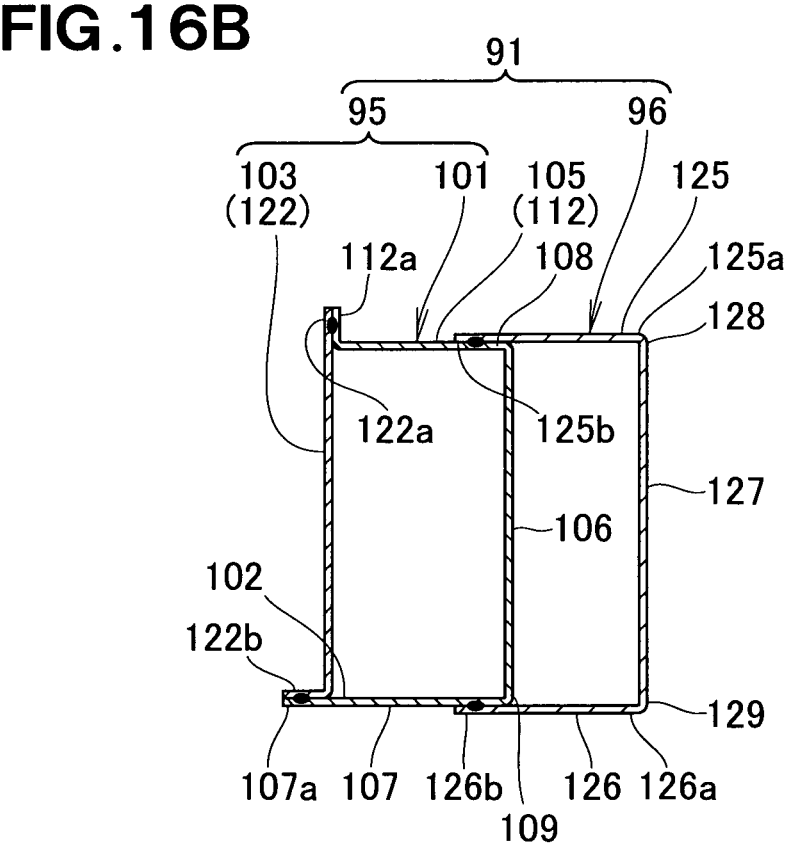
FIG. 16B is a sectional view taken along line 16b-16b of FIG. 15.
Figure 17:
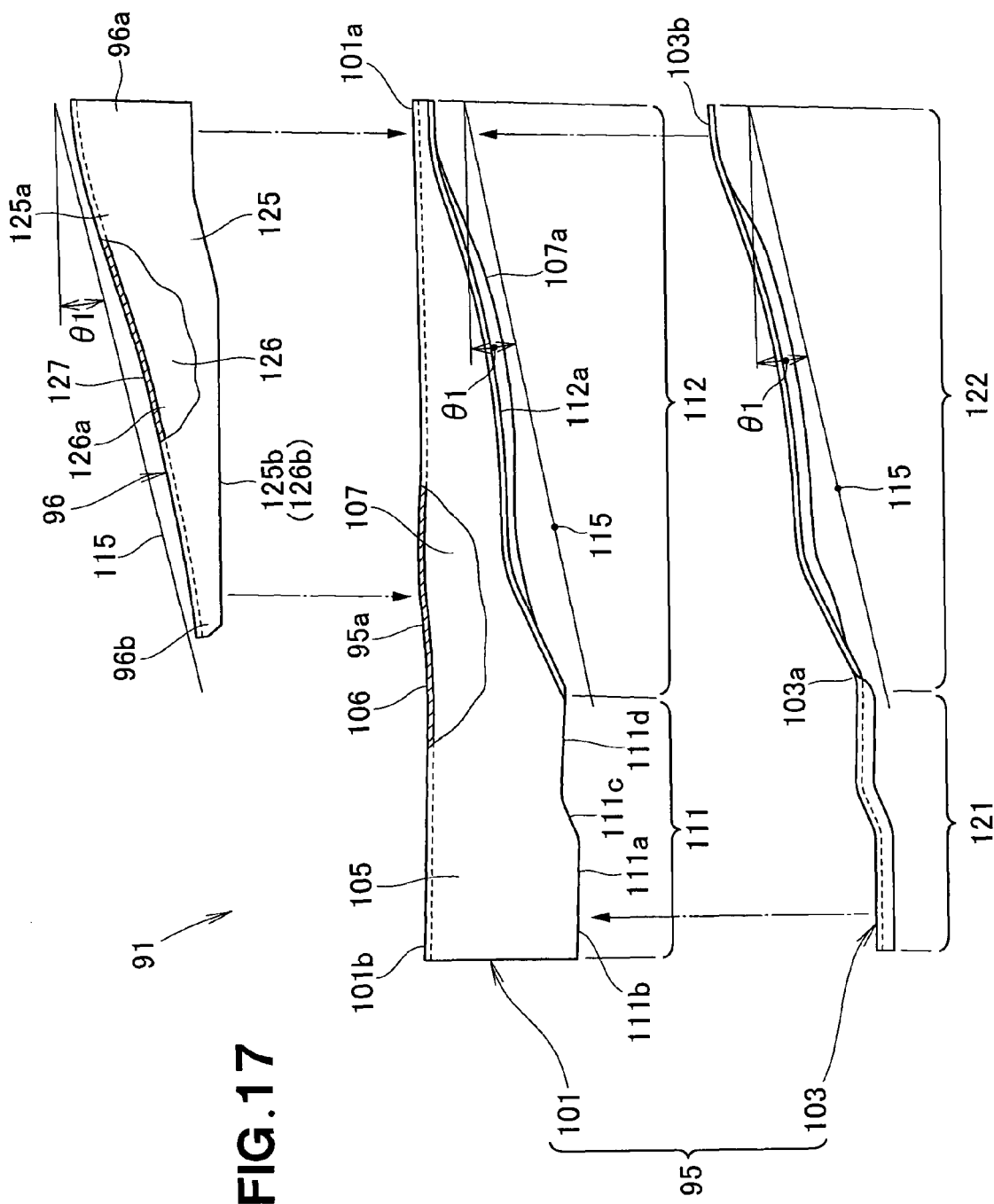
FIG. 17 is an exploded view showing a left front side frame in the second embodiment.

FIG. 15 is a plan view showing principal sections of the second embodiment of the vehicle front body structure, FIG. 16A is a sectional view taken along the 16a-16a line of FIG. 15, FIG. 16B is a sectional view taken along the 16b-16b line of FIG. 15, and FIG. 17 is an exploded view showing a left front side frame in the second embodiment.

The second embodiment of the vehicle front body structure 90 is different from the first embodiment 10 in that it includes left and right side frames (only the left front side frame 91 is shown with illustration of the right side frame omitted) in place of the left and right side frames 11 and 12 in the first embodiment.

The impact absorbing structure 20 is provided on the front end portions of the left and right front side frames 91 and on the front end portions 15a and 16a (see FIG. 1) of the left and right upper members 15 and 16. The left and right front side frames 91 in the second embodiment are disposed and constructed in left-right symmetrical relation to each other, and thus, only the left front side frame 91 will be described in detail below with a detailed description of the right front side frame omitted.

The left front side frame 91 includes a compressive-load bearing frame section 95 for bearing an impact load applied acting in a direction from the inner impact absorbing section 62 toward the rear of the vehicle body, and a bending-load bearing frame section 96 for bearing an impact load acting in a direction from the inner impact absorbing section 62 toward the longitudinal centerline 48 (see FIG. 2).

The compressive-load bearing frame section 95 includes a side frame member 101 of a laterally-facing U sectional shape with an opening portion 102 (see FIG. 16A) opening laterally outward, and an outer side wall (i.e., outer side wall portion) 103 provided in an opening portion 102 of the frame member 101. The compressive-load bearing frame section 95 is formed in a closed sectional shape by the outer side wall 103 closing the opening portion 102.

The side frame member 101 has upper and lower wall portions 105 and 107 extending horizontally in the front-rear and width directions of the vehicle body and an inner side wall portion extending vertically between the respective inner side edges of the upper and lower wall portions 105 and 107.

The side frame member 101 has a generally laterally-facing U sectional shape defined by the upper and lower wall portions 105 and 107 and inner wall portion 106. With such a generally laterally-facing U sectional shape, the side frame member 101 has an upper convex ridge 108 where the upper and inner wall portions 105 and 106 intersect each other, and a lower convex ridge 109 where the lower and inner wall portions 107 and 106 intersect each other.

The inner wall portion 106 of the side frame member 101 extends generally straight from the inner impact absorbing section 62. The upper wall portion 105 has a flat front upper surface portion 111, and a rear surface portion formed in a generally L sectional shape as seen in FIG. 16B.

As shown in FIG. 17, an outer side edge 111a of the upper wall portion 111 has a front straight portion 111b, middle stepped portion 111c and rear straight portion 111d. The middle stepped portion 111c slants toward the centerline 48 in a front-to-rear direction. Namely, the outer side edge 111a of the front upper surface portion 111 is formed generally along a line 115 slanting at a slanting angle θ1. Thus, the upper wall portion 105 of the side frame member 101 is formed in such a manner that its horizontal width gradually increases from the rear end portion 101*a* toward the front end portion 101*b* of the side frame member 101.

Similarly to the upper wall portion 105, the lower wall portion 107 shown in FIG. 17 is formed along the line 115 slanting at the slanting angle θ1 and in such a manner that its horizontal width gradually increases from the rear end portion 101*a* toward the front end portion 101*b* of the side frame member 101.

The outer side wall 103 has a front section 121 having a generally U sectional shape, and a rear section 122 having a generally L sectional shape. As shown in FIG. 16A, the front section 121 of the outer side wall 103 has upper and lower bent portions 121*a* and 121*b* extending along the upper and lower edges of the opening portion 102 of the side frame member 101. Further, as shown in FIG. 16B, the rear section 122 of the outer side wall 103 has upper and lower bent portions 122*a* and 122*b* extending along the upper and lower edges of the opening portion 102 of the side frame member 101. The outer side wall 103 is fixed to the upper wall portion 105 (outer side edge 111*a* or bent portion 112*a*) and lower wall portion 107 (outer side edge 107*a*).

More specifically, the outer side wall 103 is provided along the line 115 slanting at the slanting angle θ1, and it is slightly curved from its substantial longitudinally-middle portion to a rear end portion 103*b*.

The bending-load bearing frame section 96 not only extends from a substantial longitudinally-middle portion 95*a* of the compressive-load bearing frame section 95 toward the rear of the vehicle body but also gradually bulges toward the longitudinal centerline 48 (see FIG. 2), to bear an impact load acting in the direction from the inner impact absorbing section 62 toward the longitudinal centerline 48.

As shown in FIG. 16B, the bending-load bearing frame section 96 has an upper wall portion 125 superposed on part of the upper wall portion 105 of the side frame member 101, a lower wall portion 126 superposed on part of the lower wall portion 107 of the side frame member 101, and an inner side wall portion 127 extending vertically between respective inner edges 125*a* and 126*a* of the upper and lower wall portions 125 and 126.

The bending-load bearing frame section 96 has a generally laterally-facing U sectional shape defined by the upper and lower wall portions 125 and 126 and inner wall portion 127. With such a generally laterally-facing U sectional shape, the bending-load bearing frame section 96 has an upper convex ridge 128 where the upper and inner wall portions 125 and 126 intersect each other, and a lower convex ridge 129 where the lower and inner wall portions 126 and 127 intersect each other.

With such a bending-load bearing frame section 96 provided on the side frame member 101 in the aforementioned manner and with the inner wall portion 106 provided between the bending-load bearing frame section 96 and the side frame member 101, the bending-load bearing frame section 96 and the side frame member 101 each have a closed sectional shape.

Because the bending-load bearing frame section 96 has the upper and lower ridge portions 128 and 129 and is formed in a closed sectional shape as noted above, the bending-load bearing frame section 96 has an increased rigidity.

The upper wall portion 125 of the bending-load bearing frame section 96 has an outer side edge 125*b* formed to extend straight toward the rear, and an inner side edge 125*a* formed to slant along the line 115 slanting at the slanting angle θ1. Thus, the upper wall portion 125 of the bending-load bearing frame section 96 is formed in such a manner that its horizontal width gradually decreases from its rear end portion 96*a* toward its front end portion 96*b*.

Similarly, the lower wall portion 126 of the bending-load bearing frame section 96 shown in FIG. 17 has an outer side edge 126*b* formed to extend straight toward the rear and an inner side edge 126*a* formed to slant along the line 115 slanting at the slanting angle θ1. Thus, the lower wall portion 126 of the bending-load bearing frame section 96 is formed in such a manner that its horizontal width gradually decreases from its rear end portion 96*a* toward its front end portion 96*b*, similarly to the upper wall portion 125.

The inner wall portion 127 of the bending-load bearing frame section 96 extends vertically between the inner side edge 125*a* of the upper wall portion 125 and the inner side edge 126*a* of the lower wall portion 126. Thus, as viewed in plan, the inner wall portion 127 of the bending-load bearing frame section 96 slants along the line 115 slanting at the slanting angle θ1.

More specifically, the inner wall portion 127 of the bending-load bearing frame section 96 is slightly curved from the front end portion 96*b* to the rear end portion 96*b*.

Further, in the left front side frame 91, the inner wall portion 106 of the side frame member 101 extends from the inner impact absorbing section 62 toward the rear of the vehicle body. Thus, the left front side frame 91 shown in FIG. 15 can efficiently bear an impact load, acting in a direction from the inner impact absorbing section 62 toward the rear of the vehicle body as indicated by arrow I, by means of the compressive-load bearing frame section 95 (particularly by the inner wall portion 106 and upper and lower ridge portions 108 and 109).

Further, in the left front side frame 91, the outer side wall 103 is slightly curved from the substantial longitudinally-middle portion 95*a* of the compressive-load bearing frame section 95 toward the rear of the vehicle body, and the inner wall portion 127 of the bending-load bearing frame section 96 is slightly curved from the front end portion 96*b* toward the rear of the vehicle body.

Thus, the outer side wall 103 is gently curved from the substantial longitudinally-middle portion 95*a* toward the longitudinal centerline 48 along the inner wall portion 127 of the bending-load bearing frame section 96. Namely, a rear half portion, including the bending-load bearing frame section 96, of the left front side frame 91 is gently curved.

Because the bending-load bearing frame section 96 has the upper and lower ridge portions 128 and 129 and is formed in a closed sectional shape as noted above, the bending-load bearing frame section 96 has an increased rigidity. In this way, the left front side frame 91 shown in FIG. 15 can efficiently bear an impact load, acting in a direction from the inner impact absorbing section 62 toward the longitudinal centerline 48 as indicated by arrow G, by means of the bending-load bearing frame section 96.

Furthermore, as in the first embodiment, the outer side wall 103 and inner side wall portion 78 of the outer impact absorbing section 63 together constitute a partly-overlapping section 81; namely, the inner side wall portion 78 of the of the outer impact absorbing section 63 is located closer to the longitudinal centerline 48, extending centrally through the width of the vehicle body, than the outer side wall 103 of the left front side frame 91. Further, the outer side wall 103 is disposed the line 115 slanting at the slanting angle θ1.

Part of an impact load applied to the outer impact absorbing section 63 acts generally parallel to the line 115 slanting at the θ1 angle, so that the part of the impact load can be efficiently transmitted along the inner side wall portion 78 to the outer side wall 103 as indicated by arrow K.

Because the outer side wall 103 of the compressive-load bearing frame section 95 is curved generally along the bending-load bearing frame section 95, the left front side frame 91 can be formed in a gently curved shape. Thus, an impact load transmitted to the outer side wall 103 by way of the partly-overlapping section 81 acts along the side wall 103 and bending-load bearing frame section 96. In this way, impact load transmitted to the outer side wall 103 by way of the partly-overlapping section 81 can be efficiently borne by the side wall 103 and bending-load bearing frame section 96.

Further, because the front side frame 91 is formed in a gently curved shape, the front side frame 91 need not have a great width, and thus, the instant embodiment permits reduction in weight of the front side frame 91.

Next, a description will be given about a manner in which the impact absorbing structure 20 employed in the second embodiment of the vehicle front body structure 90 absorbs impact energy caused by a low-speed offset collision.

Namely, when another vehicle has lightly collided against the impact absorbing structure 20 with a leftward offset from the longitudinal centerline 48 extending centrally through the width of the vehicle body, an impact load caused by the low-speed (light) offset collision can be absorbed by the left impact absorbing unit 25 (i.e., inner and outer impact absorbing sections 62 and 63) being collapsed by the impact load in the same manner as explained above in relation to the first embodiment with reference to FIGS. 6A and 6B.

Thus, in the case of the light (low-speed) offset collision, the impact load (namely, impact energy) can be absorbed without the left front side frame 91 and left upper member 15 being deformed. Consequently, after the light offset collision, the vehicle body only has to be subjected to a simple repair where just the bolts 68 are removed to replace the bumper beam 27 and left impact absorbing unit 25 with new ones.

Next, with reference to FIGS. 18A-19, a description will be given about a manner in which the impact absorbing structure 20 employed in the second embodiment of the vehicle front body structure 90 absorbs impact energy caused by a high-speed offset collision.

Figure 18A:
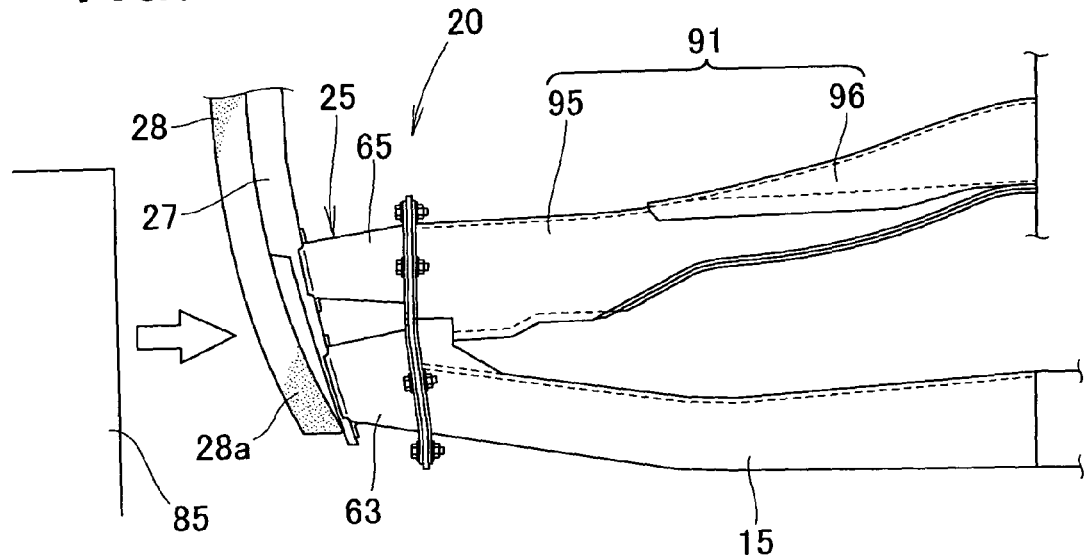
FIGS. 18A and 18B are views explanatory of a manner in which an impact absorbing structure employed in the second embodiment absorbs impact energy caused by a high-speed offset collision.
Figure 18B:
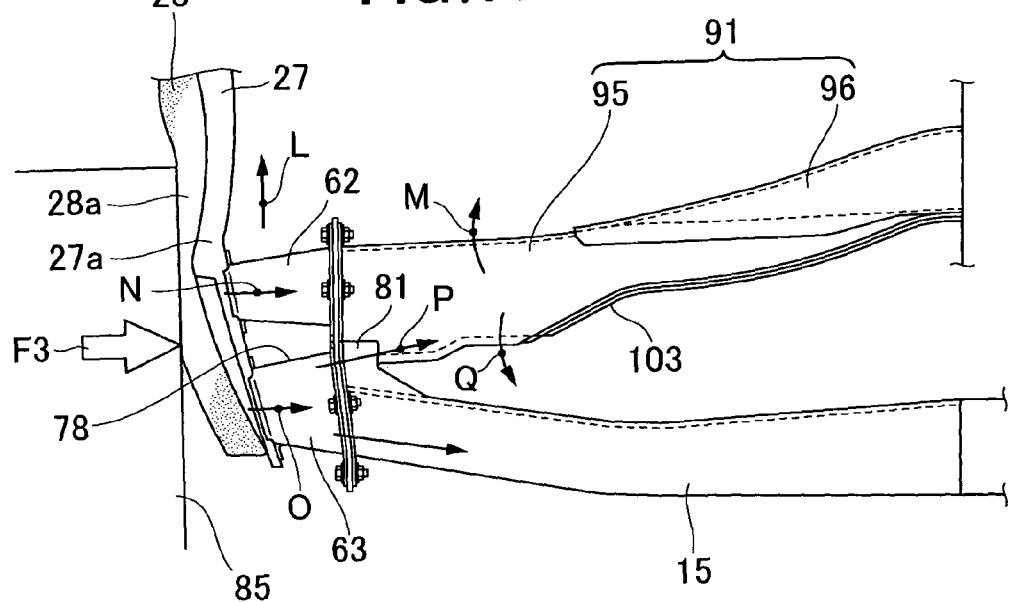

Namely, when another vehicle 85 has heavily collided against the left end portion 28a of the energy absorbing member 28 with a leftward offset from the longitudinal centerline 48 (high-speed offset collision) as shown in FIG. 18A, the left end portion 28a of the energy absorbing member 28 and left end portion 27a of the bumper beam 27 are deformed as shown in FIG. 18B.

Because of the deformation of the left end portion 27a of the bumper beam 27, the impact load acts on the left end portion 27a in the direction toward the longitudinal centerline 48 as indicated by arrow L. Such an impact load acts on the left front side frame 91, by way of the inner impact absorbing section 62, in a direction to deform the frame 91 as indicated by arrow M.

In the second embodiment, as set forth above, the left front side frame 91 includes the bending-load bearing frame section 96 in its rear half area, and the bending-load bearing frame section 96 is gently curved in such a manner that its rear end portion is located closer to the longitudinal centerline 48. Thus, the left front side frame 91 can efficiently bear an impact load, acting in the direction from the inner impact absorbing section 62 toward the longitudinal centerline 48 as indicated by arrow L, by means of the bending-load bearing frame section 96.

Meanwhile, the impact load F3 caused by the high-speed offset collision is transmitted, by way of the left end portion 28a of the energy absorbing member 28 and left end portion 27a of the bumper beam 27, to the inner impact absorbing section 62 as indicated by arrow N and to the outer impact absorbing section 63 as indicated by arrow O.

As set forth above, the inner side wall portion 78 of the outer impact absorbing section 63 and the outer side wall member 103 of the left front side frame 91 together constitute the partly-overlapping section 81. Thus, part of the impact load applied to the outer impact absorbing section 63 can be efficiently transmitted along the inner side wall portion 78 to the outer side wall member 103 as indicated by arrow P. This impact load would act in a direction to deform the left front side frame 91 as indicated by arrow Q (i.e., in an opposite direction from arrow M).

In this way, the impact load that would act to bend the left front side frame 91 toward the longitudinal centerline 48 as indicated by arrow M can be canceled out by the impact load transmitted to the outer side wall member 103 of the left front side frame 91.

Because the impact load that would act to bend the left front side frame 91 toward the longitudinal centerline 48 as indicated by arrow M (i.e., bending load) is borne by the bending-load bearing frame section 96 and such an impact load is canceled out by the impact load transmitted to the outer side wall member 103 as noted above, the instant embodiment can even more effectively bear the bending load acting on the left front side frame 91, to thereby even more reliably prevent the left front side frame 91 from being deformed in the arrow M direction. As a result, the instant embodiment can achieve a sufficient rigidity of the left front side frame 91 against bending without provision of a particular reinforcing member, such as a stiffener, as well as reduction in weight of the left front side frame 91.

Figure 19:
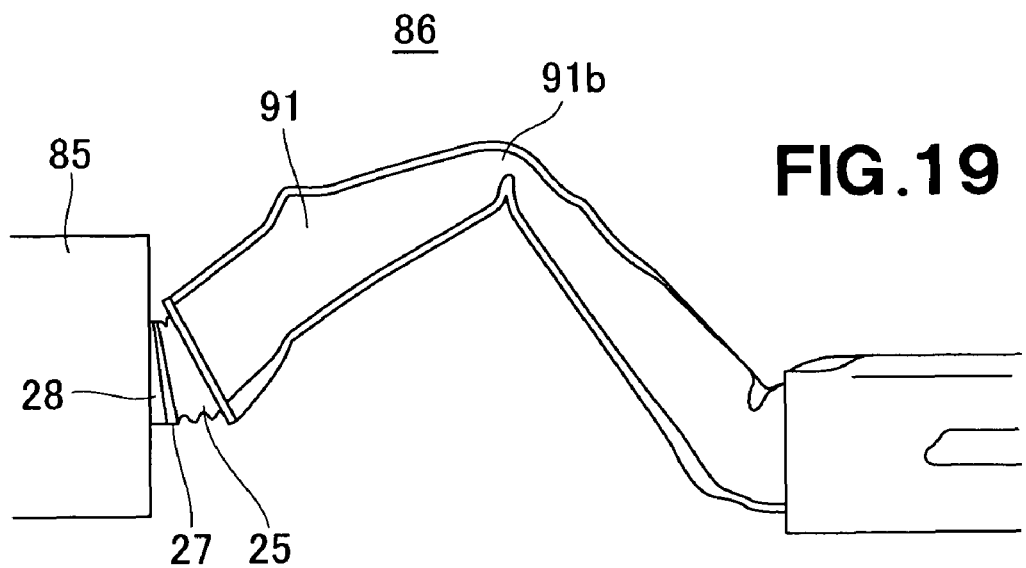
FIG. 19 is a view showing in more detail how the impact absorbing structure employed in the second embodiment absorbs impact energy caused by the high-speed offset collision.
Figure 20:
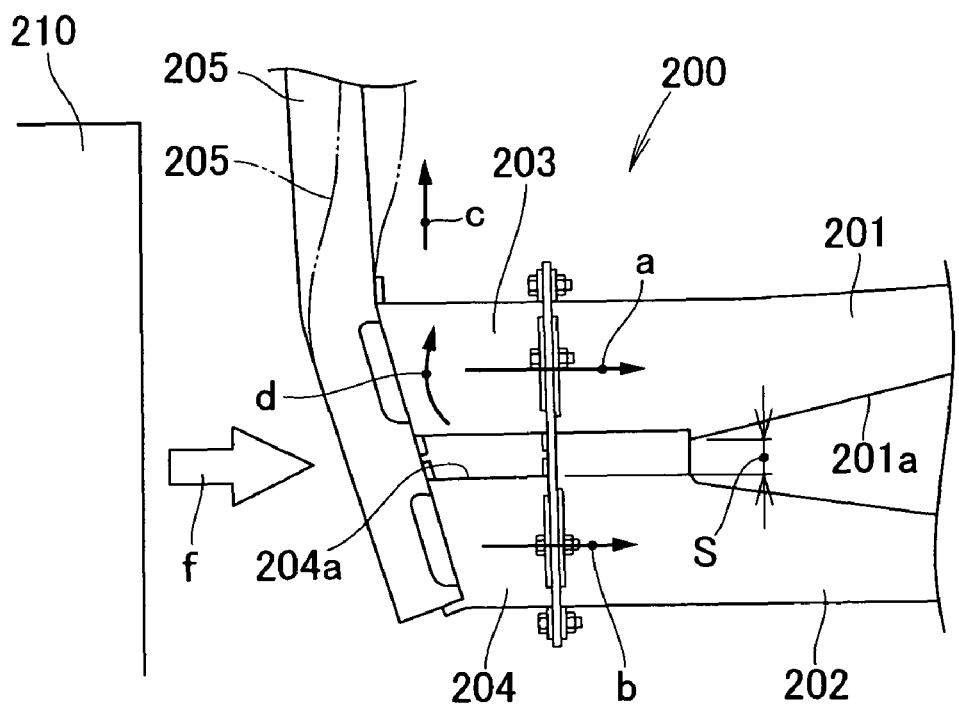
FIG. 20 is a view showing a manner in which impact energy caused by an offset collision is absorbed by a conventionally-known vehicle front body structure.

FIG. 19 is a view explanatory of how the impact absorbing structure 20 employed in the second embodiment absorbs impact energy caused by a high-speed offset collision. Because the left front side frame 91 can be prevented from being bent in the arrow M direction (see FIG. 18B), the instant embodiment allows the left front side frame 91 to be deformed into an appropriately collapsed state. More specifically, the instant embodiment allows a substantial longitudinally-middle portion 91b of the left front side frame 91 to be deformed into a generally doglegged collapsed shape, so that the impact load can be efficiently absorbed.

Because the left front side frame 91 can be deformed into a generally doglegged collapsed shape as noted above, the left front side frame 91 can function as a crushable zone that allows the engine room 86 to be collapsed in an appropriate manner.

In this way, the instant embodiment can secure a sufficient deformation amount of the left and right front side frames 11 and 12, to thereby effectively prevent unwanted deformation of a vehicle compartment located behind the engine room 86.

The second embodiment of the vehicle front body structure 90 arranged in the above-described manner can achieve the same advantageous benefits as the first embodiment of the vehicle front body structure 10.

Whereas the first and second embodiments have been described above in relation to the case where the outer mounting section 21b of the left mounting plate 21 slants rearwardly at the angle θ3 relative to the inner mounting section 21a, the present invention is not so limited; for example, the outer mounting section 21b may be disposed parallel to the inner mounting section 21a.

Further, whereas the first and second embodiments have been described above in relation to the case where the inner impact absorbing section 62 and the outer impact absorbing section 63 are fixed to the left front side frame 11, 91 and left upper member 15, respectively, by means of bolts, the present invention is not so limited; for example, the inner impact absorbing section 62 and the outer impact absorbing section 63 may be fixed to the left front side frame 11, 91 and left upper member 15, respectively, by welding.

Furthermore, whereas the first and second embodiments have been described above in relation to the case where the airbag device 112, deployable in response to acceleration detected by the acceleration sensor 30, is provided in the steering wheel 114, the present invention is not so limited, the airbag device 112 may be provided in an instrument panel or seat.

It should be noted that the above description about the construction and behavior of the left front side frame 11, left upper member 15 and other components associated with the left front side frame 11 and left upper member 15 applies to the right front side frame 12, right upper member 16 and other components associated with the left front side frame 12 and right upper member 16. Therefore, needless to say, the adjective "left" used above for the components, such as the left impact absorbing unit and left acceleration sensor, pertaining to the left front side frame 11, left upper member 15, etc. should read as "right" for the corresponding components pertaining to the right front side frame 12, right upper member 16, etc.

INDUSTRIAL APPLICABILITY

The present invention is particularly useful when applied to automotive vehicles where impact absorbing sections are provided on left and right front side frames and a bumper beam is fixed to the impact absorbing sections.

The invention claimed is:

1. A vehicle front body structure including, on each of left and right sides of a vehicle body, a front side frame extending in a front-rear direction of the vehicle body, and an upper member disposed laterally outwardly of the front side frame, said vehicle front body structure comprising:

separate inner and outer impact absorbing sections connected to and provided forward of respective front ends of the front side frame and upper member for absorbing an impact load acting on a front of the vehicle body;

an overlapping section constructed by positioning an inner side wall portion of said outer impact absorbing section closer to a longitudinal centerline of the vehicle body than an outer side wall portion of the front side frame so that a rear end portion of said outer impact absorbing section and a front end portion of the front side frame partly overlap each other, whereby part of the impact load can be transmitted to the outer side wall portion by way of said overlapping section.

2. The vehicle front body structure of claim 1, wherein said front side frame includes:

a compressive-load bearing frame section that extends straight from said inner impact absorbing section toward a rear of the vehicle body, so as to bear an impact load acting in a direction from said inner impact absorbing section toward the rear of the vehicle body; and a separate bending-load bearing frame section connected to said compressive-load bearing frame section and that extends from a substantial longitudinally-middle portion of said compressive-load bearing frame section toward the rear of the vehicle body and bulges toward the longitudinal centerline in a curved shape, so as to bear an impact load acting in a direction from said inner impact absorbing section toward the longitudinal centerline.

3. The vehicle front body structure of claim 2, wherein said compressive-load bearing frame section has an outer side wall portion curved generally along said bending-load bearing frame section, so that said front side frame is formed in a generally curved shape.

4. The vehicle front body structure of claim 1, further comprising an acceleration sensor for detecting acceleration of the vehicle to cause an airbag of the vehicle to be deployed when an impact load has acted on said inner and outer impact absorbing sections, wherein said inner impact absorbing section projects forward from the front end of the front side frame by a greater length than said outer impact absorbing section projecting forward from the front end of the upper member, and an acceleration threshold value for deploying the airbag is set within a range between an acceleration level when a portion of said inner impact absorbing section projecting forward beyond said outer impact absorbing section is deformed by impact energy and an acceleration level when said inner and outer impact absorbing sections are deformed after deformation of said inner impact absorbing section reaches said outer impact absorbing section.

5. The vehicle front body structure of claim 4, wherein said acceleration sensor is provided at a position remote from said inner impact absorbing section but close to said outer impact absorbing section.

6. The vehicle front body structure of claim 1, wherein said inner side wall portion of said outer impact absorbing section slants laterally inward at a slanting angle from a front end portion of said outer impact absorbing section to said rear end portion of said outer impact absorbing section, the slating angle being substantially equal to a slanting angle of an outer edge of an upper wall portion of said front side frame.

7. The vehicle front body structure of claim 1, further comprising a mounting plate for connecting said inner and outer impact absorbing sections to the respective front ends of said front side frame and said upper member, wherein a region adjacent to said inner side wall portion of said outer impact absorbing section overlaps a region of said front end of said front side frame adjacent to said outer side wall portion of said front side frame, the two regions at least partially constituting said overlapping section, said mounting plate being interposed between the two regions.

8. The vehicle front body structure of claim 1, wherein a front end portion of said upper member includes an upward bulge bulging obliquely upward toward the longitudinal centerline of the vehicle and a downward bulge bulging obliquely downward toward the longitudinal centerline of the vehicle, the upward and downward bulges receiving a portion of said outer side wall portion of said front side frame.

9. A vehicle front body structure including, on each of left and right sides of a vehicle body, a front side frame extending in a front-rear direction of the vehicle body, and an upper member disposed laterally outwardly of the front side frame, said vehicle front body structure comprising:

separate inner and outer impact absorbing sections connected to and provided forward of respective front ends of the front side frame and upper member for absorbing an impact load acting on a front of the vehicle body;

an overlapping section at least partially constituted by a rear end portion of said outer impact absorbing section partly overlapping a front end portion of the front side frame, whereby part of the impact load can be transmitted to an outer side wall portion of said front side frame by way of said overlapping section; and an acceleration sensor for detecting acceleration of the vehicle to cause an airbag of the vehicle to be deployed when an impact load has acted on said inner and outer impact absorbing sections, wherein an acceleration threshold value for deploying the airbag is set within a range between an acceleration level when a portion of said inner impact absorbing section is first deformed by impact energy and an acceleration level when both said inner and outer impact absorbing sections are deformed after deformation of said portion of said inner impact absorbing section.

10. The vehicle front body structure of claim 9, wherein said inner impact absorbing section projects forward from the front end of the front side frame by a greater length than said outer impact absorbing section projecting forward from the front end of the upper member.

11. The vehicle front body structure of claim 9, wherein said acceleration sensor is provided at a position remote from said inner impact absorbing section but close to said outer impact absorbing section.

12. A vehicle front body structure including, on each of left and right sides of a vehicle body, a front side frame extending in a front-rear direction of the vehicle body, and an upper member disposed laterally outwardly of the front side frame, said vehicle front body structure comprising:

separate inner and outer impact absorbing sections connected to and provided forward of respective front ends of the front side frame and upper member for absorbing an impact load acting on a front of the vehicle body; and an acceleration sensor for detecting acceleration of the vehicle to cause an airbag of the vehicle to be deployed when an impact load has acted on said inner and outer impact absorbing sections, wherein said inner impact absorbing section projects forward from the front end of the front side frame by a greater length than said outer impact absorbing section projecting forward from the front end of the upper member, and an acceleration threshold value for deploying the airbag is set within a range between an acceleration level when a portion of said inner impact absorbing section projecting forward beyond said outer impact absorbing section is deformed by impact energy and an acceleration level when said inner and outer impact absorbing sections are deformed after deformation of said inner impact absorbing section reaches said outer impact absorbing section.

13. The vehicle front body structure of claim 12, wherein said front side frame includes:

a compressive-load bearing frame section that extends straight from said inner impact absorbing section toward a rear of the vehicle body, so as to bear an impact load acting in a direction from said inner impact absorbing section toward the rear of the vehicle body; and a bending-load bearing frame section that extends from a substantial longitudinally-middle portion of said compressive-load bearing frame section toward the rear of the vehicle body and bulges toward a longitudinal centerline of the vehicle body in a curved shape, so as to bear an impact load acting in a direction from said inner impact absorbing section toward the longitudinal centerline of the vehicle body.

14. The vehicle front body structure of claim 13, wherein said compressive-load bearing frame section has an outer side wall portion curved generally along said bending-load bearing frame section, so that said front side frame is formed in a generally curved shape.

15. The vehicle front body structure of claim 12, wherein said acceleration sensor is provided at a position remote from said inner impact absorbing section but close to said outer impact absorbing section.

16. The vehicle front body structure of claim 12, further comprising:

an overlapping section constructed by positioning an inner side wall portion of said outer impact absorbing section closer to a longitudinal centerline of the vehicle body than an outer side wall portion of the front side frame so that a rear end portion of said outer impact absorbing section and a front end portion of the front side frame partly overlap each other, whereby part of the impact load can be transmitted to the outer side wall portion by way of said overlapping section.

* * * * *